US011917067B2

(12) United States Patent
Brandt

(10) Patent No.: US 11,917,067 B2
(45) Date of Patent: Feb. 27, 2024

(54) APPARATUSES, METHODS, AND SYSTEMS FOR INSTRUCTIONS FOR USAGE RESTRICTIONS CRYPTOGRAPHICALLY TIED WITH DATA

(71) Applicant: Intel Corporation, Santa Clara, CA (US)

(72) Inventor: Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 16/729,352

(22) Filed: Dec. 28, 2019

(65) Prior Publication Data
US 2021/0203504 A1 Jul. 1, 2021

(51) Int. Cl.
| | | |
|---|---|---|
| *H04L 9/32* | (2006.01) | |
| *G06F 9/30* | (2018.01) | |
| *H04L 9/08* | (2006.01) | |

(52) U.S. Cl.
CPC ........ *H04L 9/3226* (2013.01); *G06F 9/30178* (2013.01); *H04L 9/0861* (2013.01); *H04L 2209/12* (2013.01)

(58) Field of Classification Search
CPC . H04L 9/3226; H04L 9/0861; H04L 2209/12; G06F 9/30178
See application file for complete search history.

(56) References Cited

U.S. PATENT DOCUMENTS 8,914,648 B1 * 12/2014 Pierson .................. G06F 21/64
713/189
9,135,450 B2 9/2015 Grobman et al.
(Continued)

FOREIGN PATENT DOCUMENTS

| KR | 20170059082 A | * 11/2015 | ......... G06F 21/6209 |
|---|---|---|---|
| KR | 20170059082 A | * 10/2017 | |

OTHER PUBLICATIONS

Gueron et al., "AES-GCM-SIV: Nonce Misuse-Resistant Authenticated Encryption", Available Online at <https://tools.ietf.org/html/rfc8452>, RFC 8452, AES-GCM-SIV: Nonce Misuse-Resistant Authenticated Encryption, Apr. 2019, pp. 1-43.

*Primary Examiner* — Darshan I Dhruv
(74) *Attorney, Agent, or Firm* — NICHOLSON DE VOS WEBSTER & ELLIOTT LLP

(57) ABSTRACT

Systems, methods, and apparatuses relating to circuitry to implement an instruction to create and/or use data that is restricted in how it can be used are described. In one embodiment, a hardware processor comprises a decoder of a core to decode a single instruction into a decoded single instruction, the single instruction comprising a first input operand of a handle including a ciphertext of an encryption key (e.g., cryptographic key), an authentication tag, and additional authentication data, and a second input operand of data encrypted with the encryption key, and an execution unit of the core to execute the decoded single instruction to: perform a first check of the authentication tag against the ciphertext and the additional authentication data for any modification to the ciphertext or the additional authentication data, perform a second check of a current request of the core against one or more restrictions specified by the additional authentication data of the handle, decrypt the ciphertext to generate the encryption key only when the first check indicates no modification to the ciphertext or the additional authentication data, and the second check indicates the one or more restrictions are not violated, decrypt the data encrypted with the encryption key to generate unencrypted data, and provide the unencrypted data as a resultant of the single instruction.

25 Claims, 19 Drawing Sheets

(56) References Cited

U.S. PATENT DOCUMENTS

| | | |
|---|---|---|
| 9,680,653 B1* | 6/2017 | Bradbury ............ G06F 9/30018 |
| 10,097,349 B2 | 10/2018 | Grobman et al. |
| 10,313,129 B2 | 6/2019 | Gopal et al. |
| 10,785,028 B2 | 9/2020 | Girkar et al. |
| 10,963,593 B1* | 3/2021 | Campagna ............ H04L 9/0861 |
| 10,979,403 B1* | 4/2021 | Mutescu ............... H04L 9/0631 |
| 2015/0040130 A1* | 2/2015 | Ali ........................ G06F 21/575 |
| | | 718/1 |
| 2015/0121516 A1* | 4/2015 | Korkishko ............... G06F 21/31 |
| | | 726/19 |
| 2016/0380772 A1* | 12/2016 | Gopal ...................... G09C 1/00 |
| | | 713/170 |
| 2017/0026181 A1* | 1/2017 | Chhabra ............... H04L 9/3234 |
| 2017/0093567 A1* | 3/2017 | Gopal .................... G06F 21/602 |
| 2018/0204025 A1* | 7/2018 | Chhabra ............. G06F 12/1408 |
| 2019/0089530 A1* | 3/2019 | Wu ............................. H04L 9/30 |
| 2021/0334784 A1* | 10/2021 | Tsai ...................... G06Q 20/341 |
| 2022/0103369 A1* | 3/2022 | Adams ................. H04L 9/3234 |
| 2022/0141004 A1* | 5/2022 | Murray ................. H04L 9/0825 |
| | | 713/171 |

* cited by examiner

600

```
┌─────────────────────────────────────────────────────────────────────────┐
│ FETCH A SINGLE INSTRUCTION HAVING AN OPCODE THAT INDICATES A DECRYPT    │
│ OPERATION IS TO BE PERFORMED AND A FIELD TO IDENTIFY FIRST INPUT OPERAND│
│ OF A HANDLE INCLUDING A CIPHERTEXT OF AN ENCRYPTION KEY, AN AUTHENTICATION│
│ TAG, AND ADDITIONAL AUTHENTICATION DATA, AND A SECOND INPUT OPERAND OF  │
│ DATA ENCRYPTED WITH THE ENCRYPTION KEY 602                              │
└─────────────────────────────────────────────────────────────────────────┘
                                   │
                                   ▼
┌─────────────────────────────────────────────────────────────────────────┐
│        DECODE THE SINGLE INSTRUCTION INTO A DECODED SINGLE INSTRUCTION 604│
└─────────────────────────────────────────────────────────────────────────┘
                                   │
                                   ▼
┌─────────────────────────────────────────────────────────────────────────┐
│          RETRIEVE DATA ASSOCIATED WITH THE IDENTIFIED INPUT OPERANDS 606│
└─────────────────────────────────────────────────────────────────────────┘
                                   │
                                   ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│          SCHEDULE THE DECODED SINGLE INSTRUCTION FOR EXECUTION 608      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                   │
                                   ▼
┌─────────────────────────────────────────────────────────────────────────┐
│ EXECUTE THE DECODED SINGLE INSTRUCTION TO PERFORM A FIRST CHECK OF THE  │
│ AUTHENTICATION TAG AGAINST THE CIPHERTEXT AND THE ADDITIONAL            │
│ AUTHENTICATION DATA FOR ANY MODIFICATION TO THE CIPHERTEXT OR THE       │
│ ADDITIONAL AUTHENTICATION DATA, PERFORM A SECOND CHECK OF A CURRENT     │
│ REQUEST OF THE CORE AGAINST ONE OR MORE RESTRICTIONS SPECIFIED BY THE   │
│ ADDITIONAL AUTHENTICATION DATA OF THE HANDLE, DECRYPT THE CIPHERTEXT TO │
│ GENERATE THE ENCRYPTION KEY ONLY WHEN THE FIRST CHECK INDICATES NO      │
│ MODIFICATION TO THE CIPHERTEXT OR THE ADDITIONAL AUTHENTICATION DATA, AND│
│ THE SECOND CHECK INDICATES THE ONE OR MORE RESTRICTIONS ARE NOT VIOLATED,│
│ DECRYPT THE DATA ENCRYPTED WITH THE ENCRYPTION KEY TO GENERATE          │
│ UNENCRYPTED DATA, AND PROVIDE THE UNENCRYPTED DATA AS A RESULTANT OF THE│
│ SINGLE INSTRUCTION 610                                                  │
└─────────────────────────────────────────────────────────────────────────┘
                                   │
                                   ▼
┌─────────────────────────────────────────────────────────────────────────┐
│          COMMIT THE RESULTANT OF THE EXECUTED INSTRUCTION 612           │
└─────────────────────────────────────────────────────────────────────────┘
```

FIG. 6

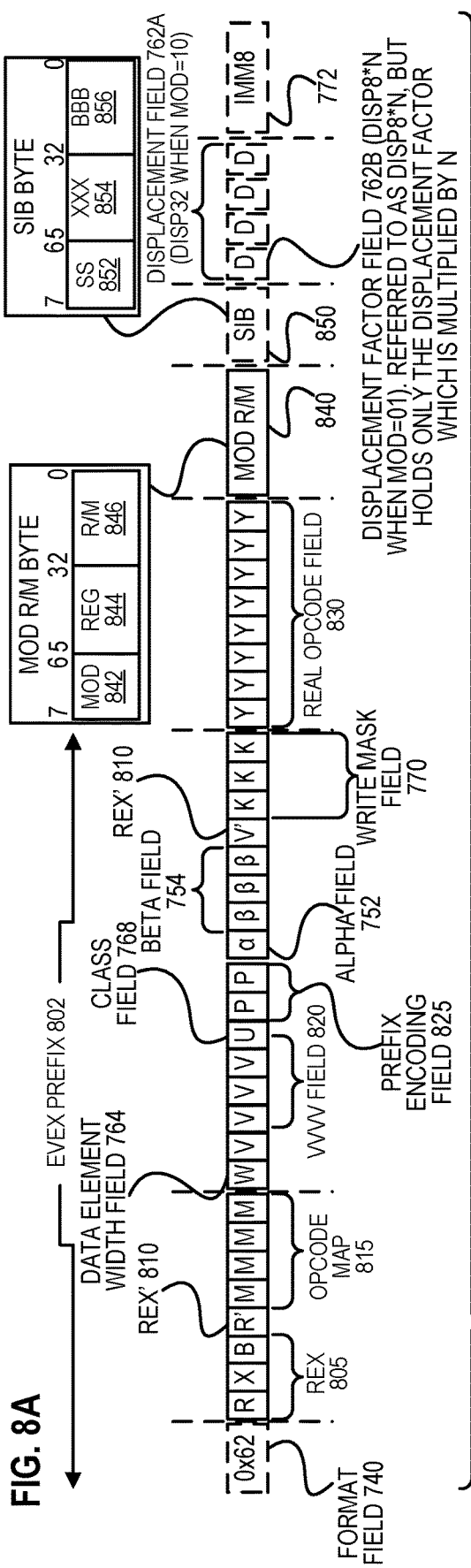
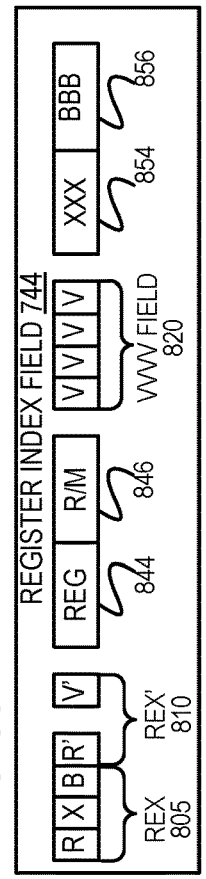
FIG. 8A
FIG. 8B
FIG. 8C

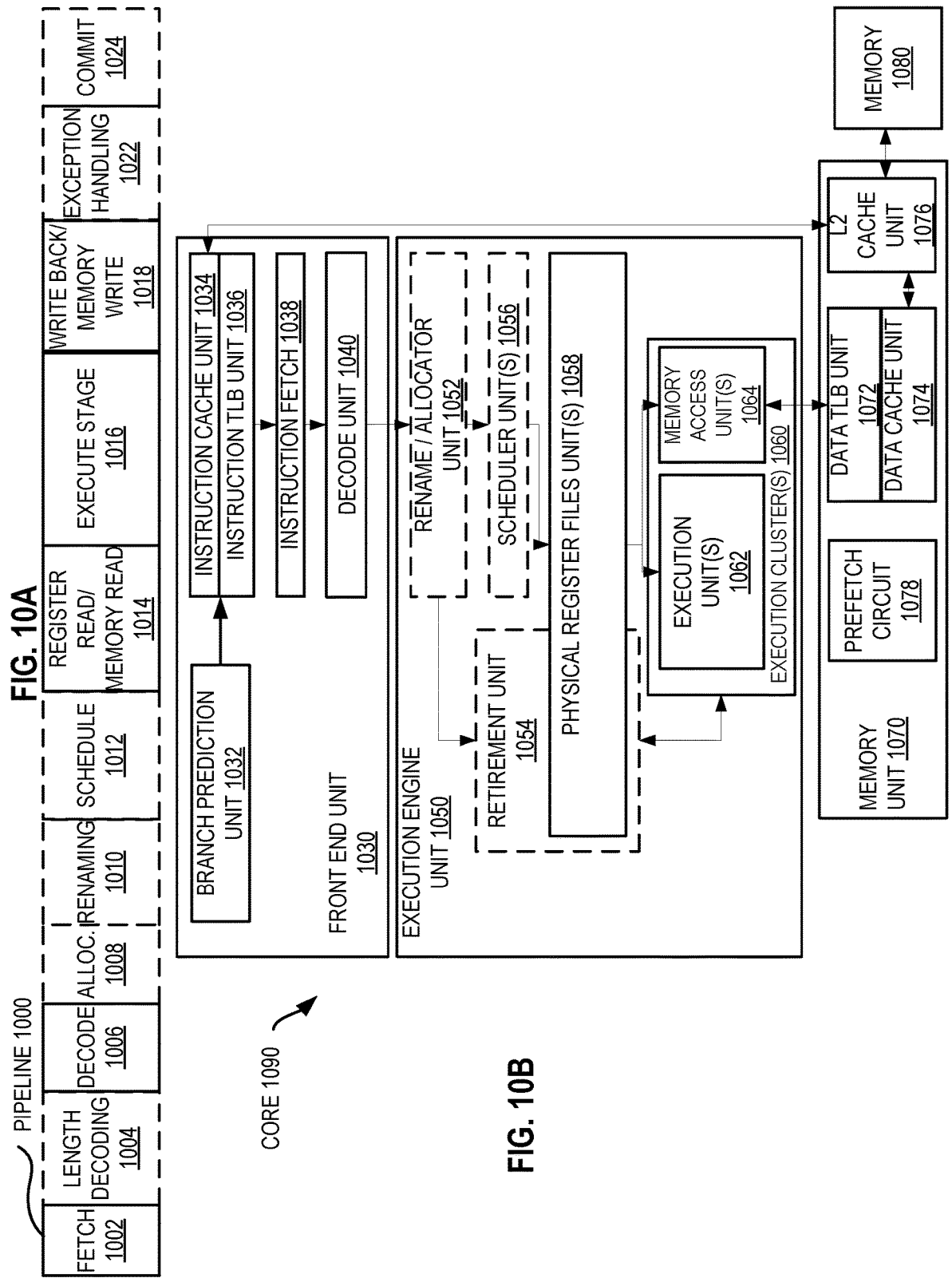

APPARATUSES, METHODS, AND SYSTEMS FOR INSTRUCTIONS FOR USAGE RESTRICTIONS CRYPTOGRAPHICALLY TIED WITH DATA

TECHNICAL FIELD

The disclosure relates generally to electronics, and, more specifically, an embodiment of the disclosure relates to circuitry to implement an instruction to create and/or use data that is restricted in how it can be used.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6 illustrates a method of processing a decryption instruction utilizing a handle according to embodiments of the disclosure.

FIG. 8A is a block diagram illustrating fields for the generic vector friendly instruction formats in FIGS. 7A and 7B according to embodiments of the disclosure.

FIG. 8B is a block diagram illustrating the fields of the specific vector friendly instruction format in FIG. 8A that make up a full opcode field according to one embodiment of the disclosure.

FIG. 8C is a block diagram illustrating the fields of the specific vector friendly instruction format in FIG. 8A that make up a register index field according to one embodiment of the disclosure.

FIG. 10A is a block diagram illustrating both an exemplary in-order pipeline and an exemplary register renaming, out-of-order issue/execution pipeline according to embodiments of the disclosure.

FIG. 10B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
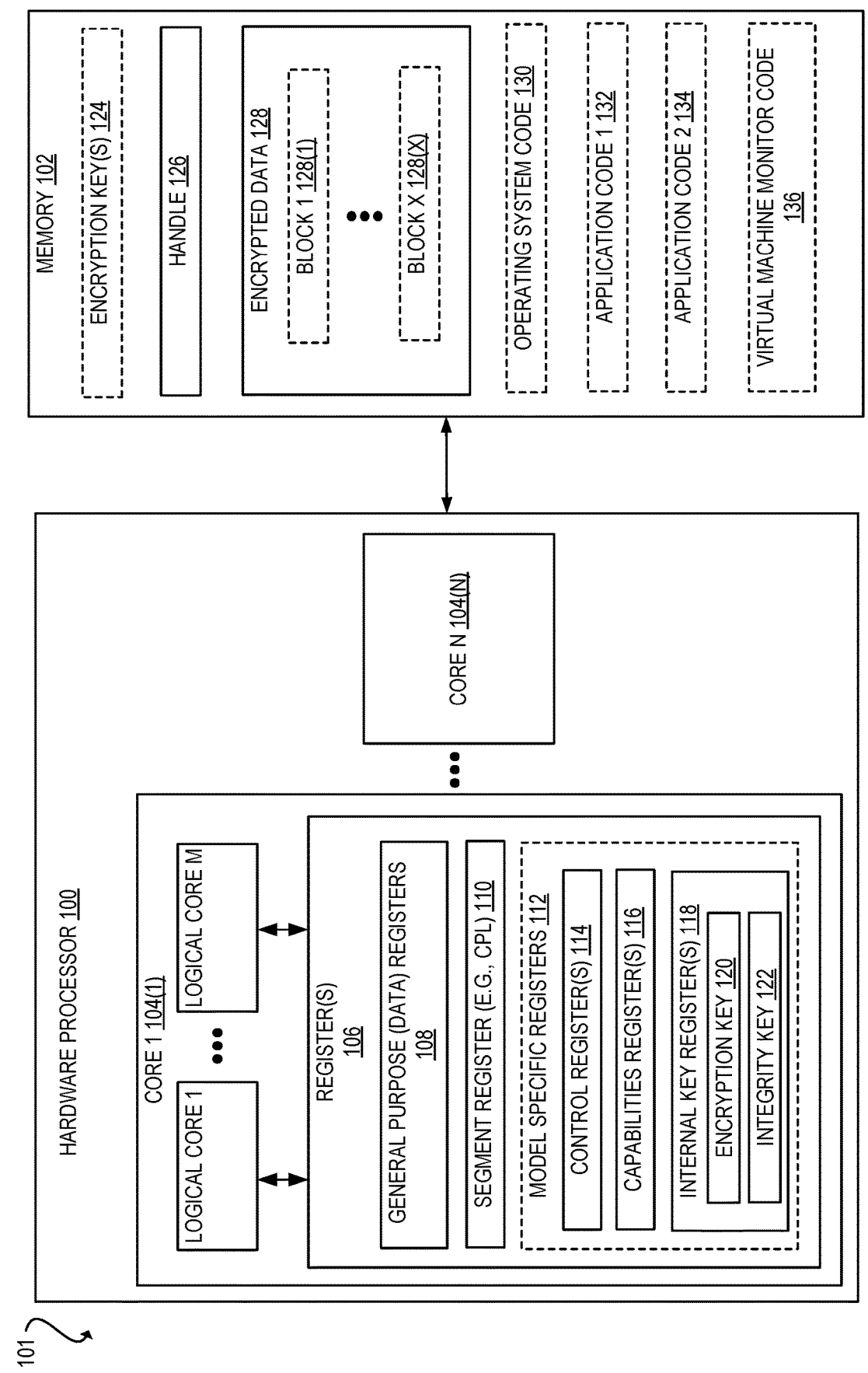
FIG. 1 illustrates a block diagram of a multiple core hardware processor utilizing a handle according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A hardware processor may use an encryption key (e.g., cryptographic key) to encrypt and/or decrypt data, for example, data that is desired to be protected from an attacker. The embodiments herein mitigate hardware and software attack scenarios that steal the underlying key, e.g., a key according to an Advanced Encryption Standard (AES). Certain embodiments herein limit operations to the way they are intended to be used so that an attacker who steals the encrypted data is unable to access it. In one embodiment, an encryption key for data (e.g., disk) encryption to limited to only being usable in the OS and not in an application. In certain embodiments, a processor (e.g., at request of software) converts keys into respective "handles" that do not reveal the key value (e.g., with the original key then deleted from memory), and then the processor performs encryption and/or decryption with the handle using one or more of the instructions disclosed herein. In certain embodiments, a particular handle cannot be used on other systems or after revocation (e.g. after reboot). Handles can be specified with restrictions on what is allowed, for example, the handle being used by an operating system (OS) only, the handle being used for encryption only, or the handle being used for decryption only. Non-limiting usages of the instructions and methods herein are for cryptographic libraries, disk encryption, networking, any software using an encryption standard (such as AES). In one embodiment, a cryptographic library use is to abstract (e.g., hide) the use of the handle from applications.

In certain embodiments, an instruction set architecture of a hardware processor includes one or more of the instructions discussed herein to create and/or use data (e.g., original data) that is restricted in how it can be used. Although the below uses a cryptographic key as an example of the original data that is being protected, this is merely an example and other uses are possible. In one embodiment, an encryption (e.g., cryptographic) key is restricted to only be used in a particular mode, for example, the key used just by the OS, just by a specific application, just by a specific trusted execution environment (e.g., enclave), just by a specific virtual machine, just at a specific instruction pointer, etc.

Thus, an attacker who steals (e.g., via through a side channel or a data leak) the encrypted data (e.g. including the key) is unable to use it outside of the restricted manner. For some attack scenarios, this prevents the attacker from using the data (e.g. key) at all.

Embodiments herein are an improvement to computer functionality as they protect keys from exfiltration (e.g., where a stolen "handle" is not useful on another system/ processor). Embodiments herein are an improvement to computer functionality as they are easily revoked (e.g. after security issue is detected), for example, where use of a handle ensures that the attacker who steals the handle does not get the true key (e.g., where the handle is not useful after revocation (e.g., reboot) so an attacker must persist their access). As discussed further below, a handle's use can be limited to a particular request (e.g., based on the mode/ usage). For example, limiting use of a handle to only an OS (e.g., ring 0) only, to encryption only, to decryption only, to being virtual machine (VM) specific (e.g., assuming a virtual machine monitor (VMM) does not set up guests to share handle space), to being process specific, to being (e.g., secure) trusted execution environment specific, or any combination thereof. In one embodiment, a trusted execution environment is a (e.g., secure) enclave. In one embodiment, a trusted execution environment is a trusted domain (TD), e.g., a TD that is being worked on where an entire VM (e.g., guest) is run in a way that it is protected against attack from a malicious VMM that is managing it.

Certain embodiments herein are an improvement to computer functionality as they allow protection of data with the instructions discussed herein in contrast to switching to a different environment (e.g., a secure virtual machine or a trusted execution environment) in order to use data (e.g. a key) which can be high overhead and more complicated for software to manage than just directly using the data with native processor instructions.

FIG. 1 illustrates a block diagram of a multiple core hardware processor 100 utilizing a handle 126 according to embodiments of the disclosure. Hardware processor 100 including a plurality of cores 104(1) to 104(N) e.g., where N is any integer one (e.g., a single core type of processor) or greater (e.g., multicore type of processor). Hardware processor 100 is depicted as coupled to a system memory 102, e.g., forming a computing system 101. In the depicted embodiment, a core of (e.g., each core of) hardware processor 100 includes a plurality of logical cores (e.g., logical processing elements or logical processors), for example, where M is any integer 1 or greater. In certain embodiments, each of physical core 104(1) to physical core 104(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain embodiments, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 106 of core 104(1). In certain embodiments, each core includes its own set of registers 106. Registers 106 may include one or more general purpose (e.g., data) registers 108 to perform (e.g., logic or arithmetic) operations in, for example, additionally or alternatively to accessing (e.g., load or store) data in memory 102. Registers 106 may include a segment register 110, e.g., to store data indicating a current privilege level of software operating on a logical core, e.g., separately for each logical core. In one embodiment, current privilege level is stored in a current privilege level (CPL) field of a code segment selector register of segment register 110. In certain embodiments, processor 100 requires a certain level of privilege to perform certain actions, for example, actions requested by a particular logical core (e.g., actions requested by software running on that particular logical core).

Registers 106 may include one or more model specific registers 112. In one embodiment, model specific registers 112 are configuration and/or control registers. In certain embodiments, each physical core has its own respective set of registers 106. In certain embodiments, each logical core (e.g., of multiple logical cores of a single physical core) has its own respective set of registers 106. In certain embodiments, each logical core has its own respective configuration and/or control registers. In one embodiment, one or more (e.g., model specific) registers are (e.g., only) written to at the request of the OS running on the processor, e.g., where the OS operates in privilege (e.g., system) mode but does not operate in non-privilege (e.g., user) mode. In one embodiment, a model specific register can only be written to by software running in supervisor mode, and not by software running in user mode. Registers 106 may include capabilities register(s) 116, e.g., to indicate if the processor (e.g., core) is capable of performing the instruction(s) or other functionality discussed herein.

Registers 106 (e.g., model specific registers 110) may include one or more of control register(s) 114, capabilities register(s) 116, or internal key register(s) 118, e.g., in addition to other control registers. In one embodiment, each logical core has its own respective control register(s) 114, capabilities register(s) 116, internal key register(s) 118, or any combination thereof. In one embodiment, a plurality of logical cores share a single register, e.g., share one or more general purpose (e.g., data) registers 108.

In certain embodiments, each logical core includes its own (e.g., not shared with other logical cores) control register(s) 114, capabilities register(s) 116, and/or internal key register(s) 118, e.g., separate from the data registers 108. In one embodiment, internal key register(s) 118 is a write only register (e.g., it can only be written by software, and not read by software). In certain embodiments, control register(s) 114 and/or capabilities register(s) 116 are each read and write registers, e.g., with a write allowed when the write requestor (e.g., software) has an appropriate (e.g., permitted) privilege level (and/or predictor mode) and/or a read allowed for any privilege level. Each register may be read only (e.g., by a logical core operating in a privilege level below a threshold) or read and write (e.g., writable by a logical core operating in a privilege level above the threshold). In certain embodiments, read and write registers are readable and writeable only in supervisor privilege level. In certain embodiments, write-only registers are writeable only in supervisor privilege level and not readable for any privilege level. In certain embodiments, read-only registers are readable only in supervisor privilege level and not writeable for any privilege level.

Memory may include an encryption key 124, handle 126, and/or encrypted data 128 (e.g., multiple blocks 128(1) to 128(X) of encrypted data, where X is any integer greater than 1). In one embodiment, each block of encrypted data is encrypted by its own encryption key 124. In one embodiment, multiple blocks of encrypted data are encrypted by a single encryption key 124.

Memory 102 may include (e.g., store) one or more of (e.g., any combination of) the following software: operating system (OS) code 130, first application code 132, second (or more) application code 134, virtual machine monitor code 136, or any combination thereof. First application code 132 or second application code 134 may be a respective user program.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

Certain embodiments herein perform encryption/decryption using a handle 126 instead of a key for encrypted data 128. In one embodiment, a method (e.g., an instruction) uses data that was converted into the handle 126. In certain embodiments, a handle includes the original data encrypted with a key (e.g., encryption key 124), an integrity measurement (e.g., an authentication tag), and additional authentication data (e.g., metadata) specifying restrictions on how the data can be used (e.g., the additional authentication data also being protected by the integrity measurement). Example restrictions are that the handle (e.g., key encrypted within the handle) is not usable for encrypt/decrypt at CPL (e.g., ring) greater than zero, not usable for encrypt, and/or not usable for decrypt. Example format of handle 126 is a (e.g., 384 bit) handle for a first size of keys (e.g., 128 bit keys) where a first field (e.g., bits [127:0] of the handle 126) is the additional authentication data, a second field (e.g., bits [255:128] of the handle 126) are an authentication tag, and a third field is the encrypted version (e.g., ciphertext) of the original data (e.g., encryption key) (e.g., bits [383:256] of the handle 126). Another example format of handle 126 is a (e.g., 512 bit) handle for a second size of keys (e.g., 256 bit keys) where a first field (e.g., bits [127:0] of the handle 126) is the additional authentication data, a second field (e.g., bits [255:128] of the handle 126) are an authentication tag, a third field is one portion (e.g., the first half of bits of ciphertext bits in [127:0]) of the encrypted version of the encryption key (e.g., bits [383:256] of the handle 126), and a fourth field is the other portion (e.g., the second half of bits of ciphertext bits in [255:128]) of the encrypted version of the encryption key (e.g., bits [511:383] of the handle 126). An example format of the additional authentication data includes one or more of the following: a first bit position (e.g., index [0]) when set (e.g., to one) indicates the handle is not usable in CPL>0, a second bit position (e.g., index [1]) when set (e.g., to one) indicates the handle is not usable for encryption, a third bit position (e.g., index [2]) when set (e.g., to one) indicates the handle is not usable for decryption, another bit position (e.g., bits [27:24]) indicating a key type (e.g., 0 for a 128 bit key and 1 for a 256 bit key).

In one embodiment, the additional (e.g., authentication) data is integrity protected but not encrypted. In one embodiment, the additional (e.g., authentication) data is both integrity protected as well as confidentiality protected by being encrypted. For example, the metadata may be "in the clear" (meaning it can be observed inside the handle), but the concept of restrictions can also be done with the metadata being encrypted (e.g., so that an attacker who gets the handle does not know what restrictions are applied on the handle).

In certain embodiments, a handle is created by encrypting original data of an encryption key 124 (e.g., encryption key 124 used to encrypt a block of data in encrypted data 128) and setting the desired bit(s) in the additional authentication data. In certain embodiments, the ciphertext of the encrypted "encryption key" 124 and the (e.g., encrypted or unencrypted) additional authentication data are bound together to form an authentication tag, for example, by binding the associated data (e.g., additional authentication data) to the ciphertext and to the context where it is supposed to appear/be used so that attempts to "cut-and-paste" a valid ciphertext into a different context are detected and rejected, for example, by performing an authenticated encryption with associated data (e.g., to allow a recipient to check the integrity of both the encrypted and unencrypted information in a message). In certain embodiments, a nonce is utilized to create a handle. In certain embodiments, a nonce is not utilized to create a handle. In one embodiment, attempts to modify the ciphertext or the additional authentication data having a particular authentication tag will cause a failure to decrypt the ciphertext using that authentication tag (e.g., and the encryption key 120 and/or the integrity key 122). In certain embodiments, an encryption key 124 is deleted after generation of a corresponding handle. Generation of a handle is discussed in further detail below in reference to FIG. 4.

In certain embodiments, a handle 126 is generated for a future request (e.g., mode/usage) of the processor (e.g., core 104(1)) (e.g., a request corresponding to the restrictions specified in the additional authentication data) where the handle is to be used. For example, a future request (e.g., mode and/or use) may be for executing an OS (e.g., ring 0) only, encryption, decryption, executing a particular virtual machine (VM), executing a particular process, executing in a (e.g., secure) enclave, or any combination thereof. In one embodiment, a request (e.g., an instruction as discussed in reference to FIG. 2) to decrypt or encrypt is received by the core 104(1), and in response, the core is to read the handle 126 and the internal key register 118 (e.g., having a key used to create the encrypted handle 126). In certain embodiments, the key(s) used to create a handle are private to the core 104(1), e.g., as stored in internal key register 118 (e.g., and not accessed by a read MSR or write MSR instruction, but only by an instruction as discussed in reference to FIG. 3).

In certain embodiments, after reading the handle 126 and the key used to create the encrypted handle 126, the core 104(1) performs a check of the authentication tag of the handle 126 against the ciphertext of the handle 126 (which in one example, is the encryption key for the encrypted data 128) and the additional authentication data of the handle 126 for any modification to the ciphertext or the additional authentication data, and if that passes, then performs a check of a current request (e.g., mode/use) of the core 104(1) against one or more restrictions specified by the additional authentication data of the handle 126, and decrypts the ciphertext to generate the original data (e.g., plaintext) (e.g., encryption key in one example) of the ciphertext only when the first check indicates no modification to the ciphertext or the additional authentication data, and the second check indicates the one or more restrictions are not violated. Core 104(1) may then decrypt or encrypt data with the unencrypted encryption key, e.g., decrypt the encrypted data 128 with the encryption key that is now in plaintext format.

In certain embodiments, a processor (e.g., CPU) caches the mapping from the handle to the plaintext format of the original data in order to avoid the latency or power required to decrypt the ciphertext format of the original data in the common case. In one embodiment, decryption is still needed when the "handle" to "original data" mapping is not present in the cache. Certain embodiments utilize a special cache for this purpose, e.g., not a data/instruction cache.

Figure 2:
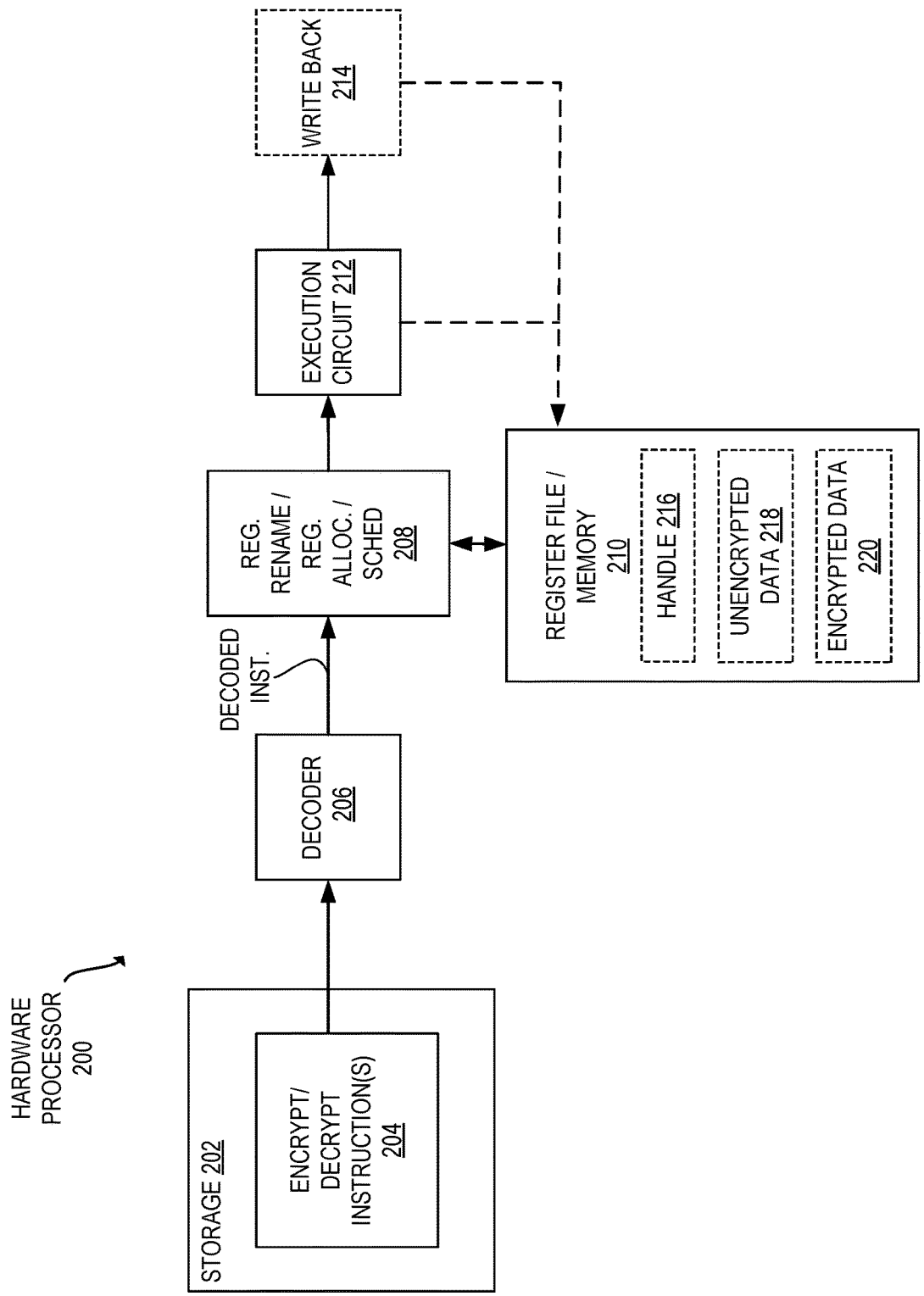
FIG. 2 illustrates a hardware processor coupled to storage that includes one or more encryption or decryption instructions utilizing a handle according to embodiments of the disclosure.

FIG. 2 illustrates a hardware processor 200 coupled to storage 202 that includes one or more encryption or decryption instructions 204 utilizing a handle 216 according to embodiments of the disclosure. In certain embodiments, an encryption or decryption instruction is according to any of the disclosure herein. In one embodiment, e.g., in response to a request to perform an operation, the instruction (e.g., macro-instruction) is fetched from storage 202 and sent to decoder 206. In the depicted embodiment, the decoder 206 (e.g., decoder circuit) decodes the instruction into a decoded instruction (e.g., one or more micro-instructions or micro-operations). The decoded instruction is then sent for execution, e.g., via scheduler circuit 208 to schedule the decoded instruction for execution.

In certain embodiments, (e.g., where the processor/core supports out-of-order (OOO) execution), the processor includes a register rename/allocator circuit coupled to register file/memory circuit 210 (e.g., unit) to allocate resources and perform register renaming on registers (e.g., registers associated with the instruction). In certain embodiments, (e.g., for out-of-order execution), the processor includes one or more scheduler circuits 208 coupled to the decoder. The scheduler circuit(s) may schedule one or more operations associated with decoded instructions, including one or more operations decoded from an encryption or decryption instruction, for execution on the execution circuit 212.

In certain embodiments, a write back circuit 214 is included to write back results of an instruction to a destination (e.g., write them to a register(s) and/or memory), for example, so those results are visible within a processor (e.g., visible outside of the execution circuit that produced those results).

One or more of these components (e.g., decoder 206, register rename/register allocator/scheduler 208, execution circuit 212, register file/memory 210, or write back circuit 214) may be in a single core of a hardware processor (e.g., and multiple cores each with an instance of these components.

In one embodiment of an encryption instruction, execution circuit 212 (e.g., unit) is to determine an encryption key from the handle 216 (e.g., as discussed herein) and if no exception (e.g., fault), then is to use the encryption key to encrypt the unencrypted data 218 into encrypted data 220.

In one embodiment of a decryption instruction, execution circuit 212 (e.g., unit) is to determine an encryption key from the handle 216 (e.g., as discussed herein) and if no exception (e.g., fault from not matching the authentication tag), then is to use the encryption key to decrypt the encrypted data 220 into unencrypted (e.g., decrypted) data 218.

In certain embodiments, an encryption or decryption instruction has the format of: OPCODE{ENC,DEC}{128, 256}KL to encrypt (ENC) or decrypt (DEC) a single (e.g., 128-bit) block of data. For example, with the source and destination data in registers 108 (e.g., in one of XMM0-7 registers). For example, with the handle in memory specified by memory argument.

In certain embodiments, an encryption or decryption instruction has the format of: OPCODE{ENC, DEC}WIDE{128,256}KL encrypts/decrypts to encrypt (ENC) or decrypt (DEC) multiple (e.g., any plurality, for example, eight) blocks of (e.g., 128-bits of) data with the same, single key. For example, with the source and destination data in registers 108 (e.g., in XMM0-7 registers). For example, with the handle in memory specified by memory argument. In certain embodiments, an encryption or decryption instruction fails (e.g., throws an exception) if handle authenticity failure. In one embodiment, failure causes a set of an exception flag (e.g., EFLAGS.ZF) and do not modify destination data. In one embodiment where the destination may hold original plaintext/ciphertext, software checks for an exception flag (e.g., EFLAGS.ZF to avoid issues (e.g., putting plaintext into result). Example authenticity failures are: if handle not created (e.g., wrapped) with current (e.g., wrapping) key (e.g., internal key from internal key register 118), if handle indicates key of different size than instruction specifies, and/or if additional authentication data specifies rules that are violated (e.g. using handle outside indicated restrictions).

In certain embodiments, a handle is created from original data, and a key is an example of "original data" in this discussion, e.g., such that there is a an internal key (IKey) used to create a handle from "original data", and in the below example that original data also happens to be a different key.

In certain embodiments, an internal key (IKey) (e.g., an internal wrapping key (IWKey)) is used to create a handle from a different key that is to be used for data encryption (e.g., to create encrypted data 220) or data decryption (e.g., to create decrypted data 218). In one embodiment, software (e.g., an OS or application) is allowed to write the internal key into a processor, but software is not allowed to read the internal key from the processor, e.g., software can write into internal key register 118 in FIG. 1 but cannot read from internal key register 118. In one embodiment, the internal key is written into the processor (e.g., into internal key register 118) by execution of a load internal key instruction (e.g., LOADIKEY instruction or a register write (e.g., WRMSR) instruction). The internal key may be software specified or hardware random. Certain embodiments allow an internal key to be read out only by software in a special secure mode (e.g. system management mode (SMM) or a specially privileged enclave).

In one embodiment, software can save the internal key to a platform-scoped state (e.g., IKeyBackup) and restore it from its storage using a new architectural MSR. In one embodiment, an operating system can use this to save/restore the internal key across sleep states (e.g., S3/S4 sleep states). A virtual machine monitor (VMM) can use this to save/restore a hypervisor internal key across virtual machine execution. A processor can use this to securely distribute an internal key to other logical processors (e.g., within the same core).

In certain embodiments, internal key is programmed by software or hardware, e.g., with software specifying a random or specific value using a "load internal key" instruction (e.g. early in boot). In one embodiment, software sets up the same internal (e.g., internal to a core) key for all logical processors (e.g., logical cores), for example, all logical processors in a single core. In one embodiment, the internal key value is not locked and thus can be overwritten. Execution of a handle generation instruction (e.g., as discussed in reference to FIG. 4) may return information on what entity wrote the current internal key, e.g., and indicate a software specified value for an internal key or a randomly generated internal key. The information returned allows code to decide whether it trusts the internal key (e.g. code in a trusted execution environment may only trust random internal keys).

Figure 3:
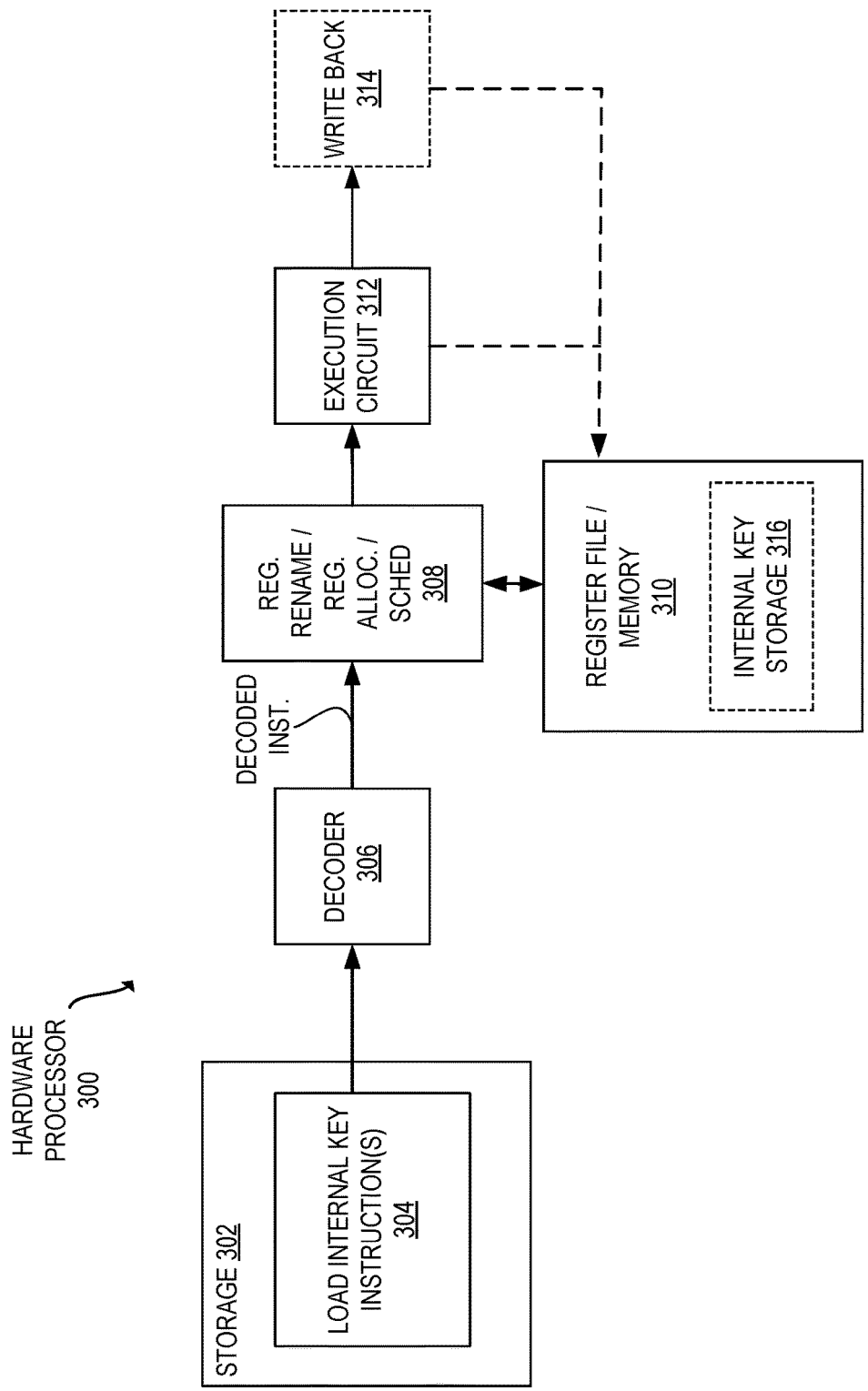
FIG. 3 illustrates a hardware processor coupled to storage that includes one or more load internal key instructions according to embodiments of the disclosure.

FIG. 3 illustrates a hardware processor 300 coupled to storage 302 that includes one or more load internal key instructions 304 according to embodiments of the disclosure. In certain embodiments, a load internal key instruction is according to any of the disclosure herein. In one embodiment, e.g., in response to a request to perform an operation, the instruction (e.g., macro-instruction) is fetched from storage 302 and sent to decoder 306. In the depicted embodiment, the decoder 306 (e.g., decoder circuit) decodes the instruction into a decoded instruction (e.g., one or more micro-instructions or micro-operations). The decoded instruction is then sent for execution, e.g., via scheduler circuit 308 to schedule the decoded instruction for execution.

In certain embodiments, (e.g., where the processor/core supports out-of-order (OOO) execution), the processor includes a register rename/allocator circuit coupled to register file/memory circuit 310 (e.g., unit) to allocate resources and perform register renaming on registers (e.g., registers associated with the instruction). In certain embodiments, (e.g., for out-of-order execution), the processor includes one or more scheduler circuits 308 coupled to the decoder. The scheduler circuit(s) may schedule one or more operations associated with decoded instructions, including one or more operations decoded from a load internal key instruction, for execution on the execution circuit 312.

In certain embodiments, a write back circuit 314 is included to write back results of an instruction to a destination (e.g., write them to a register(s) and/or memory), for example, so those results are visible within a processor (e.g., visible outside of the execution circuit that produced those results).

One or more of these components (e.g., decoder 306, register rename/register allocator/scheduler 308, execution circuit 312, register file/memory 310, or write back circuit 314) may be in a single core of a hardware processor (e.g., and multiple cores each with an instance of these components.

In one embodiment of a load internal key instruction, execution circuit 312 (e.g., unit) is to output an internal key (e.g., into internal key storage 316). In certain embodiments, an internal key (IKey) has the format of: an (e.g., 256 bit) encryption key (e.g., encryption key 120 in FIG. 1) (e.g., to encrypt original data for use a ciphertext in a handle), an (e.g., 128 bit) integrity key (e.g., integrity key 122 in FIG. 1) (e.g., a key to allow a recipient to check the integrity of both the encrypted information (e.g., ciphertext in a handle) and unencrypted information (e.g., additional authentication data in a handle)), a (e.g., 384 bit) "internal key owner" identity (e.g., owner ID), a single bit "no backup" flag, that when set, indicates that backup of the internal key to an internal key backup storage (e.g., in a cache of the core) is not allowed, and/or a source field where a first value (e.g., zero) means that software requested a specific internal key (e.g., through execution of a respective load internal key instruction) and a second value (e.g., one) means that software requested a random internal key (e.g., through execution of a respective load internal key instruction). In certain embodiments, software is not allowed to read the internal key from the processor.

In certain embodiments, a load "internal key" instruction has the format of: OPCODE (e.g., for LOADIKEY or LOADIWKEY mnemonic) source 2 (e.g., xmm_reg_src2), source 1 (e.g., xmm_reg_src1). In certain embodiments, only an OS (e.g., ring 0) can request execution of a load "internal key" instruction, for example, and not an application. In one embodiment, implicit registers are used (e.g., XMM0 and EAX). In one embodiment, IKey.Encryption_Key=concatenation of source 1 and source 2 (e.g., xmm_src_reg_2, xmm_src_reg_1) and IKey.Integrity_Key=XMM0. In one embodiment, if implicit register (e.g., EAX[1]) is set, then IKey.Encryption_Key and IKey.Integrity_Key are XORed with random numbers (e.g., from a random number generator of the core). In certain embodiments, if insufficient randomness then this will fail (e.g., not modify IKey) and set an exception (e.g., ZF) flag. In certain embodiments, implicit register (e.g., EAX[0]) specifies IKey.NoBackup value. In certain embodiments, IKey.KeySource is set to indicate software specified (e.g., EAX[1]=0) or random (e.g., EAX[1]=1). In one embodiment, a virtual machine monitor is configured to cause a LOADIKEY VM exit by setting a "LoadIKey exiting" VM execution control. In certain embodiments, the encryption key (e.g., Encryption Key) is used for encrypting the original data into the handle ciphertext while the internal key (e.g., Integrity_Key) is used for generating and verifying the authentication tag (e.g., which covers the original data and the additional authentication data).

In certain embodiments, the internal key is used for integrity and/or encryption/decryption of a handle. For example, where the handle includes an encrypted form of a key-to-be-used for encrypting data (e.g., data 128 in FIG. 1). In certain embodiments, software generates a handle from a key and other input values via handle generation instructions (e.g., ENCODEKEY128 to generate a handle from a 128 bit key and ENCODEKEY256 to generate a handle from a 256 bit key).

Figure 4:
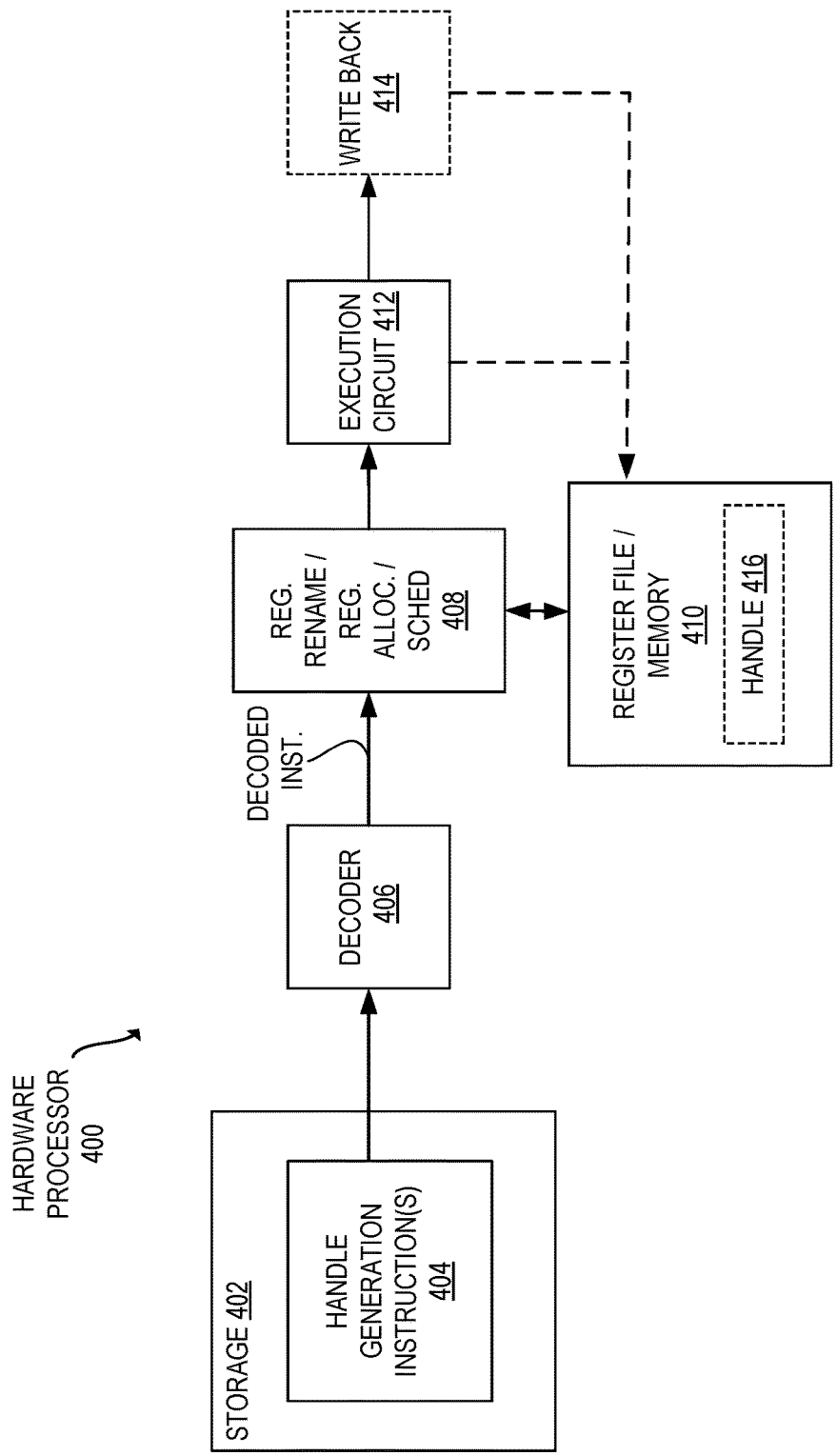
FIG. 4 illustrates a hardware processor coupled to storage that includes one or more handle generation instructions according to embodiments of the disclosure.

FIG. 4 illustrates a hardware processor 400 coupled to storage 402 that includes one or more handle generation instructions 404 according to embodiments of the disclosure. In certain embodiments, a handle generation instruction is according to any of the disclosure herein. In one embodiment, e.g., in response to a request to perform an operation, the instruction (e.g., macro-instruction) is fetched from storage 402 and sent to decoder 406. In the depicted embodiment, the decoder 406 (e.g., decoder circuit) decodes the instruction into a decoded instruction (e.g., one or more micro-instructions or micro-operations). The decoded instruction is then sent for execution, e.g., via scheduler circuit 408 to schedule the decoded instruction for execution.

In certain embodiments, (e.g., where the processor/core supports out-of-order (OOO) execution), the processor includes a register rename/allocator circuit coupled to register file/memory circuit 410 (e.g., unit) to allocate resources and perform register renaming on registers (e.g., registers associated with the instruction). In certain embodiments, (e.g., for out-of-order execution), the processor includes one or more scheduler circuits 408 coupled to the decoder. The scheduler circuit(s) may schedule one or more operations associated with decoded instructions, including one or more operations decoded from a handle generation instruction, for execution on the execution circuit 412.

In certain embodiments, a write back circuit 414 is included to write back results of an instruction to a destination (e.g., write them to a register(s) and/or memory), for example, so those results are visible within a processor (e.g., visible outside of the execution circuit that produced those results).

One or more of these components (e.g., decoder 406, register rename/register allocator/scheduler 408, execution circuit 412, register file/memory 410, or write back circuit 414) may be in a single core of a hardware processor (e.g., and multiple cores each with an instance of these components.

In one embodiment of a handle generation instruction, execution circuit 412 (e.g., unit) is to generate a handle 416 from an (e.g., AES) encryption key and an internal key (e.g., internal encryption key and an internal integrity key) (e.g., as discussed herein). In one embodiment, execution unit utilizes an encryption and integrity algorithm (e.g., AES algorithm) (e.g., the AES-GCM-SIV) to generate the handle 416. In certain embodiments, the handle 416 is written to a register (e.g., register(s) 108 in FIG. 1). In one embodiment, the handle is written into memory 102 (e.g., handle 126 in FIG. 1).

In certain embodiments, execution of a handle generation instruction also causes a destination register to be updated with a value to indicate the loader of the internal key (e.g., and software or random internal key) and if backup of the internal key is allowed. In one embodiment, software that wants only random internal key can delete handle if non-random. In certain embodiments, the execution of a handle generation instruction is allowed in all privilege levels (e.g., OS, application, enclave, etc.). In certain embodiments, the encryption/integrity algorithm does not use a key derivation function when a load internal key (e.g., encryption and integrity keys) instruction is utilized. For example, with the handle generation instruction not utilizing a nonce in its execution (e.g., not utilizing a nonce in the encryption/integrity algorithm).

In certain embodiments, a handle generation instruction takes as input not only the key, but also restrictions on how the handle can be used. In certain embodiments, a handle generation instruction takes a restriction type field in a source (e.g., source register). Example restriction is not allowing a handle to be used for encrypt/decrypt at ring greater than zero. In certain embodiments, restriction type can be seen in additional authentication data of resulting handle (e.g., in bits 127:0). In certain embodiments, restriction type and qualification can be seen in additional authentication data of resulting handle (e.g., in bits 127:0). In one embodiment, additional authentication data (AAD) of resulting handle is integrity protected (e.g., by authentication tag), but not encrypted. In certain embodiments, a single handle can indicate multiple restrictions, for example, a handle that only works in ring zero and only encrypts (not decrypt). In certain embodiments, the restriction type is evident in the handle, but restriction cannot be changed without breaking the crypto (e.g., it will destroy the original data, which in the example above in an (e.g., AES) encryption key).

In certain embodiments, a handle generation instruction (e.g., for a 128 bit key that is being converted to ciphertext) has the format below in Table 1.

TABLE 1

Example format for a handle generation instruction
(e.g., ENCODEKEY128 instruction).

| | Description |
|---|---|
| Inputs | |
| XMM0 | Input key (e.g., [127:0]) |
| Src(GPR) | Bit 23-0: Handle restriction type. |
| | Exception (e.g., #GP) if reserved encoding specified |
| | Bit 31-24 are reserved and will #GP if non-0. |
| | Upper 32-bits ignored (e.g., ignores REX.W, CS.D) |
| Outputs | |
| XMM0-XMM2 | Output of handle: |
| | XMM0 stores handle 127:0 (AAD) |
| | XMM1 stores handle 255:128 (Tag) |
| | XMM2 stores handle 383:256 (Ciphertext). |
| Dest(GPR) | Bit 0 will be set if and only if No Backup flag set |
| | Bits 4:1 will be set KeySource (0 if LoadIKey SW-specified, 1 if LoadIKey Random, other values reserved) |
| | Bits 63-5 set to 0 |
| XMM4-6 | Zeroed or may optionally hold "internal key owner" identity |

In certain embodiments, a handle generation instruction (e.g., for a 256 bit key that is being converted to ciphertext) has the format below in Table 2.

TABLE 2

Example format for a handle generation instruction
(e.g., ENCODEKEY256 instruction).

| | Description |
|---|---|
| Inputs | |
| XMM0 | Input key (e.g., [127:0]) |
| XMM1 | Input key (e.g., [255:128]) |
| Src(GPR) | Bit 23-0: Handle restriction type. |
| | Exception (e.g., #GP) if reserved encoding specified |
| | Bit 31-24 are reserved and will #GP if non-0. |
| | Upper 32-bits ignored (e.g., ignores REX.W, CS.D) |

TABLE 2-continued

Example format for a handle generation instruction
(e.g., ENCODEKEY256 instruction).

| | Description |
|---|---|
| Outputs | |
| XMM0-XMM2 | Output of handle:<br>XMM0 stores handle 127:0 (AAD)<br>XMM1 stores handle 255:128 (Tag)<br>XMM2 stores handle 383:256 (Ciphertext [127:0])<br>XMM2 stores handle 511:384 (Ciphertext [255:128]) |
| Dest(GPR) | Bit 0 will be set if and only if No Backup flag set<br>Bits 4:1 will be set KeySource (0 if LoadIKey SW-specified, 1 if LoadIKey Random, other values reserved)<br>Bits 63-5 set to 0 |
| XMM4-6 | Zeroed or may optionally hold "internal key owner" identity |

Referring again to FIG. 1, control and capabilities of the functionality discussed herein may be controlled and delineated, e.g., by control register 114 and capabilities register 116, respectively. Table 3 below discuses example bits for control and capabilities. Use of a handle may be part of a set of KeyLocker (KL) functionality.

TABLE 3

Example Enumeration of Control and Capabilities.

| CPUID Bit | When set | Indicates support for |
|---|---|---|
| KL_SUPPORTED | Hardware supports KL | CR4.KL, Basic LoadIKey instructions, KL CPUID leaf |
| ENC.DEC_KL_ENABLED | KL fully enabled (CR4.KLset, feature activation done if needed) | Load Internal Key{128,256} and Encryption or Decryption instructions {ENC,DEC} {128,256} KL instructions |
| KL Wide | HW supports WIDE*KLinstructions | Encryption or Decryption instructions {ENC,DEC} WIDE{128,256} KL instructions |
| IKeyBackup | System supports IKeyBackup | KeyLocker MSRs (IA32_COPY_LOCAL_TO_PLATFORM, IA32_COPY_PLATFORM_TO_LOCAL, IA32_COPY_STATUS, IA32_IKEYBACKUP_STATUS) |
| NoBackup | System supports NoBackup | LoadIKey withEAX[0] set |
| Random LoadIKey | System supports LoadIKey of HW with random key | LoadIKey with EAX[1] set |
| Restrictions Supported bitmap | Indicates which restrictions are supported | Which bits can be set in the source register for Load Internal Key {128,256} |

The embodiments herein may be used as infrastructure for permission checks. In certain embodiments, a (e.g., KeyLocker) handle is only usable in two ways: (i) as allowed by handle restrictions and on that same system or (ii) by an agent who know the internal key (IKey), for example, where the agent can decrypt a handle to recover original key. In certain embodiments, (ii) may be prevented by proper internal key maintenance. Handle restrictions can be used to prevent malicious software from using handles elsewhere, e.g., even if it manages to steal them.

The embodiments herein may be used as a restriction to limit handle use to an enclave. For example, if an "enclave restricted" bit in a handle is set, then that handle is only usable inside an enclave whose (e.g., 64 bit) enclave ID (EID) matches additional authenticated data field bits (e.g., 127:64) of the handle (e.g., bits that are integrity protected but not encrypted). This may prevent an attacker who steals the handle from using it outside the enclave presuming the attacker does not have the internal key. An enclave can require hardware random internal key (e.g., unknown to any software).

The embodiments herein may be used as a restriction to limit handle use to a process. For example, if a "process restricted" bit in handle is set, then that handle is only usable inside a process whose (e.g., 64 bit) process ID matches handle bits (e.g., bits [95:32]). In one embodiment, new IA32_PROCESS_ID MSR holds process ID in bits 63:0. When less bits are needed for process ID (e.g. only 48 bits), OS can use extra MSR bits for other usages (e.g. handle revocation). A particular application can use the "process restricted" bit to ensure that any handles that are stolen by another application on the system cannot use the handle.

In virtualization, virtual machine monitors (e.g., hypervisors) often pause or migrate guests (e.g. virtual machines). It may be desirable to pause a guest and resume it (e.g., months) later (e.g., after several reboots). It may be desirable to move the guest to another system (migration). In certain embodiments, a handle makes keys ephemeral so they cannot be used after reboot or on another system. As a solution to meet the desires mentioned above, an internal key may be software specified (for example, with the virtual machine monitor recording an internal key, e.g., when a guest uses a load internal key instruction) and/or the virtual machine monitor hiding/preventing usage of a load internal key instruction (e.g., with EAX[1] or can take VM exit and replace with SW specified key or even with host's internal key). In one embodiment, a virtual machine monitor backups hypervisor internal key using platform scope IKeyBackup before loading guest key.

Figure 5:
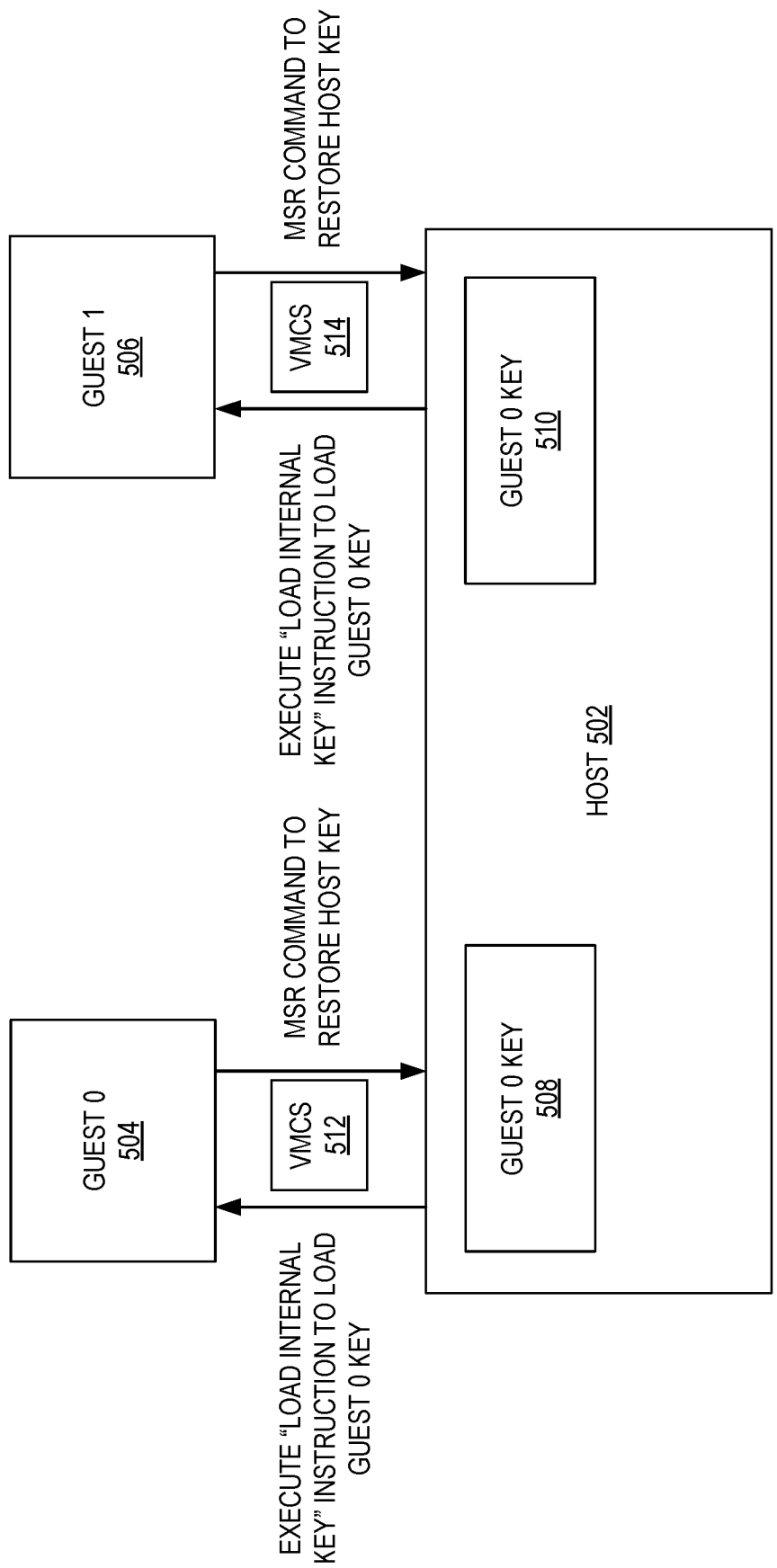
FIG. 5 illustrates execution of a first "load internal key" instruction to load a first guest key and execution of a second "load internal key" instruction to load a second guest key according to embodiments of the disclosure.

FIG. 5 illustrates execution of a first "load internal key" instruction to load a first guest key and execution of a second "load internal key" instruction to load a second guest key according to embodiments of the disclosure. Host 502 has two guests, i.e., guest 0 504 and guest 506. Depicted guest 504 includes a virtual machine control structure 512 and depicted guest 506 includes a virtual machine control structure 514. As depicted, guest 504 executes a load internal key instruction to load host 502 with guest 0 key 508. In one embodiment, on exit of guest 504, an MSR command is issued to restore host internal key instead of the guest 0 internal key. As depicted, guest 506 executes a load internal key instruction to load host 502 with guest 1 key 510. In one embodiment, on exit of guest 506, an MSR command is issued to restore host internal key instead of the guest 1 internal key.

In certain embodiments, a control register (e.g., CR4.KL (bit 19)) is used to prevent guests of legacy virtual machine monitors from writing internal key (e.g., Key Locker) state. In one embodiment, the control register is to prevent reading/writing internal key(s), e.g., with an exception (e.g., undefined (#UD)) on all handle/internal key related instructions (e.g., on all read or write internal key instructions), for example, when CR4.KL is 0. In certain embodiments, the exception does not affect the internal key value, it just cause those instructions to generate an exception. In one embodiment, a virtual machine monitor is to use an MSR bitmap to protect unknown MSRs (and thus IKeyBackup if utilized). In one embodiment, CR4.KL existence enumerated by CPUID.KL_SUPPORTED (CPUID.(07H,0).ECX[23]).

The embodiments herein may be used as a restriction to limit a handle to a guest. For example, if a "virtual machine extensions (VMX) guest" bit in handle is set, then that handle is only usable inside a VMX guest whose (e.g., 32 bit) VM ID is equal to handle bits (e.g., bits [127:96]). Certain embodiments herein allow the linking of a handle to a specific VMX guest. In one embodiment, VM ID is a field in a virtual machine control structure, e.g., different from a virtual machine control structure pointer and an extended-page-table pointer field which identify guests but change on migration and are physical addresses. For example, where it is desirable to not expose platform physical addresses to guests. A restriction to limit a handle to a guest may be utilized if a victim and attacker guests need to sometimes share handles and use the same internal key(s). In one embodiment when a victim and attacker guests use different internal keys, then they already cannot use each other's handles.

FIG. 6 illustrates a method 600 of processing a decryption instruction utilizing a handle according to embodiments of the disclosure. Depicted method 600 includes to fetch a single instruction having an opcode that indicates a decrypt operation is to be performed and a field to identify first input operand of a handle including a ciphertext of an encryption key, an authentication tag, and additional authentication data, and a second input operand of data encrypted with the encryption key 602, decode the single instruction into a decoded single instruction 604, retrieve data associated with the identified input operands 606, (optionally) schedule the decoded single instruction for execution 608, execute the decoded single instruction to perform a first check of the authentication tag against the ciphertext and the additional authentication data for any modification to the ciphertext or the additional authentication data, perform a second check of a current request of the core against one or more restrictions specified by the additional authentication data of the handle, decrypt the ciphertext to generate the encryption key only when the first check indicates no modification to the ciphertext or the additional authentication data, and the second check indicates the one or more restrictions are not violated, decrypt the data encrypted with the encryption key to generate unencrypted data, and provide the unencrypted data as a resultant of the single instruction 610, and commit the resultant of the executed instruction 612.

Certain embodiments herein are directed to an instruction that is passed in the input data (including the original data) and specified restrictions and creates a handle. In one embodiment, the original data is an encryption key. In one embodiment, the original data is an AES-128 or AES-256 encryption key. In one embodiment, the metadata (e.g., additional authentication data) is encrypted as well. In one embodiment, the metadata is not encrypted but is in the clear (but still integrity protected). In one embodiment, the original data is a key that is used for signed hashing. In one embodiment, the restriction(s) limit usage of the handle (e.g., and the original data encrypted/integrity protected within the handle) to: encrypt (e.g., specific to the data being a key), decrypt (e.g., specific to the data being a key), to ring 0 (OS/kernel), and/or a specific process. In one embodiment, the restriction(s) limit usage of the handle when a specific piece of OS controlled state is set in a specific way. In one embodiment, a mask is utilized so usage of the handle is allowed only when the specified portion of the OS controlled state is set in a specific way. In one embodiment, the restriction(s) limit usage of the handle (e.g., prevent usage of the handle) outside a specific trusted execution environment, such as, but not limited to, a specific Software Guard extension (SGX) enclave, a specific trust domain (TD) (e.g., TDX guest), or system management mode (SMM). In one embodiment, the restriction(s) limit usage of the handle when a specific piece of application controlled state is not set in the specified way, for example, to limit sub-process (e.g. only when in a specific protection key, or to use a handle for a specific bank's database accesses only when processing data for that specific bank). In one embodiment, the restriction(s) limit usage of the handle outside a virtual machine monitor. In one embodiment, the restriction(s) limit usage of the handle to a specific instruction pointer. In one embodiment, the restriction(s) limit usage of the handle when a revocation field indicates it has been revoked. In one embodiment, multiple restrictions are combined (e.g. encrypt only and only within a specific process).

Exemplary architectures, systems, etc. that the above may be used in are detailed below.

At least some embodiments of the disclosed technologies can be described in view of the following examples:

Example 1

A hardware processor comprising:
a decoder of a core to decode a single instruction into a decoded single instruction, the single instruction comprising a first input operand of a handle including a ciphertext of an encryption key (e.g., cryptographic key or other data), an authentication tag, and additional authentication data, and a second input operand of data encrypted with the encryption key; and
an execution unit of the core to execute the decoded single instruction to:
  perform a first check of the authentication tag against the ciphertext and the additional authentication data for any modification to the ciphertext or the additional authentication data,
  perform a second check of a current request of the core against one or more restrictions specified by the additional authentication data of the handle,
  decrypt the ciphertext to generate the encryption key only when the first check indicates no modification to the ciphertext or the additional authentication data, and the second check indicates the one or more restrictions are not violated {Or look-up the original data (e.g., plaintext) in a cache. Also, an implementation may perform decryption (or lookup the plaintext in a cache) even when a check fails and simply not use the original data in that "failed check" case. Or it can start to use the original data but not return the results to the user (e.g., even speculatively in order to guard against speculative execution side channels)}, decrypt the data encrypted with the encryption key to generate unencrypted data, and provide the unencrypted data as a resultant of the single instruction.

Example 2

The hardware processor of example 1, wherein the execution unit is to execute the decoded single instruction to set a flag (e.g., raise a corresponding flag) if:
the first check indicates a modification to the ciphertext or the additional authentication data; or
the second check indicates the one or more restrictions are violated.

Example 3

The hardware processor of example 1, wherein the decoder is to decode a second instruction into a decoded second instruction, and the execution unit is to execute the decoded second instruction to load into a register of the core an internal key used to decrypt the ciphertext.

Example 4

The hardware processor of example 3, wherein the execution unit is to execute the decoded second instruction to set a first value in the register to indicate software requested a specific key as the internal key through execution of the second instruction, and set a second value in the register to indicate software requested a random key as the internal key through execution of the second instruction.

Example 5

The hardware processor of example 3, wherein the internal key comprises an integrity key and a separate encryption key.

Example 6

The hardware processor of example 1, wherein the decoder is to decode a second instruction into a decoded second instruction, and the execution unit is to execute the decoded second instruction to generate the handle from an input of the encryption key and a handle restriction type.

Example 7

The hardware processor of example 1, wherein the additional authentication data comprises a field that indicates if the handle is not usable for encryption.

Example 8

The hardware processor of example 1, wherein the additional authentication data comprises a field that indicates if the handle is not usable for decryption.

Example 9

A method comprising:
decoding a single instruction into a decoded single instruction with a decoder of a core of a hardware processor, the single instruction comprising a first input operand of a handle including a ciphertext of an encryption key, an authentication tag, and additional authentication data, and a second input operand of data encrypted with the encryption key; and
executing the decoded single instruction with an execution unit of the core to:
perform a first check of the authentication tag against the ciphertext and the additional authentication data for any modification to the ciphertext or the additional authentication data,
perform a second check of a current request of the core against one or more restrictions specified by the additional authentication data of the handle,
decrypt the ciphertext to generate the encryption key only when the first check indicates no modification to the ciphertext or the additional authentication data, and the second check indicates the one or more restrictions are not violated,
decrypt the data encrypted with the encryption key to generate unencrypted data, and
provide the unencrypted data as a resultant of the single instruction.

Example 10

The method of example 9, wherein the executing the decoded single instruction sets a flag if:
the first check indicates a modification to the ciphertext or the additional authentication data; or
the second check indicates the one or more restrictions are violated.

Example 11

The method of example 9, further comprising:
decoding a second instruction into a decoded second instruction with the decoder of the core; and
executing the decoded second instruction with the execution unit of the core to load into a register of the core an internal key used to decrypt the ciphertext.

Example 12

The method of example 11, wherein the execution unit sets a first value in the register to indicate software requested a specific key as the internal key through execution of the second instruction, and sets a second value in the register to indicate software requested a random key as the internal key through execution of the second instruction.

Example 13

The method of example 11, wherein the internal key comprises an integrity key and a separate encryption key.

Example 14

The method of example 9, further comprising:
decoding a second instruction into a decoded second instruction with the decoder of the core; and
executing the decoded second instruction with the execution unit of the core to generate the handle from an input of the encryption key and a handle restriction type.

Example 15

The method of example 9, wherein the additional authentication data comprises a field that indicates if the handle is not usable for encryption.

Example 16

The method of example 9, wherein the additional authentication data comprises a field that indicates if the handle is not usable for decryption.

Example 17

A non-transitory machine readable medium that stores program code that when executed by a machine causes the machine to perform a method comprising:
decoding a single instruction into a decoded single instruction with a decoder of a core of a hardware processor, the single instruction comprising a first input operand of a handle including a ciphertext of an encryption key, an authentication tag, and additional authentication data, and a second input operand of data encrypted with the encryption key; and
executing the decoded single instruction with an execution unit of the core to:
  perform a first check of the authentication tag against the ciphertext and the additional authentication data for any modification to the ciphertext or the additional authentication data,
  perform a second check of a current request of the core against one or more restrictions specified by the additional authentication data of the handle,
  decrypt the ciphertext to generate the encryption key only when the first check indicates no modification to the ciphertext or the additional authentication data, and the second check indicates the one or more restrictions are not violated,
  decrypt the data encrypted with the encryption key to generate unencrypted data, and
  provide the unencrypted data as a resultant of the single instruction.

Example 18

The non-transitory machine readable medium of example 17, wherein the executing the decoded single instruction sets a flag if:
the first check indicates a modification to the ciphertext or the additional authentication data; or
the second check indicates the one or more restrictions are violated.

Example 19

The non-transitory machine readable medium of example 17, further comprising: decoding a second instruction into a decoded second instruction with the decoder of the core; and executing the decoded second instruction with the execution unit of the core to load into a register of the core an internal key used to decrypt the ciphertext.

Example 20

The non-transitory machine readable medium of example 19, wherein the execution unit sets a first value in the register to indicate software requested a specific key as the internal key through execution of the second instruction, and sets a second value in the register to indicate software requested a random key as the internal key through execution of the second instruction.

Example 21

The non-transitory machine readable medium of example 19, wherein the internal key comprises an integrity key and a separate encryption key.

Example 22

The non-transitory machine readable medium of example 17, further comprising: decoding a second instruction into a decoded second instruction with the decoder of the core; and executing the decoded second instruction with the execution unit of the core to generate the handle from an input of the encryption key and a handle restriction type.

Example 23

The non-transitory machine readable medium of example 17, wherein the additional authentication data comprises a field that indicates if the handle is not usable for encryption.

Example 24

The non-transitory machine readable medium of example 17, wherein the additional authentication data comprises a field that indicates if the handle is not usable for decryption.

Example 25

A hardware processor comprising:
a decoder of a core to decode a single instruction into a decoded single instruction, the single instruction comprising an input operand of a handle including a ciphertext of original data, an authentication tag, and additional authentication data; and
an execution unit of the core to execute the decoded single instruction to:
  perform a first check of the authentication tag against the ciphertext and the additional authentication data for any modification to the ciphertext or the additional authentication data, perform a second check of a current request of the core against one or more restrictions specified by the additional authentication data of the handle, decrypt the ciphertext to generate the original data only when the first check indicates no modification to the ciphertext or the additional authentication data, and the second check indicates the one or more restrictions are not violated, perform an operation on the original data to generate result data, and provide the result data as a resultant of the single instruction.

Example 26

The hardware processor of example 25, wherein the additional authentication data comprises a field that indicates if the handle is not usable outside an operating system.

Example 27

The hardware processor of example 25, wherein the additional authentication data comprises a field that indicates if the handle is not usable outside a specific trusted execution environment.

Example 28

The hardware processor of example 25, wherein the additional authentication data comprises a field that indicates if the handle is only usable when a specific piece of operating system controlled state is set in a specific way.

Example 29

The hardware processor of example 25, wherein the additional authentication data comprises a field that indicates if the handle is usable by a virtual machine monitor but not usable by a virtual machine.

Example 30

The hardware processor of example 25, wherein the additional authentication data comprises a field that indicates if the handle is not usable for decryption.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
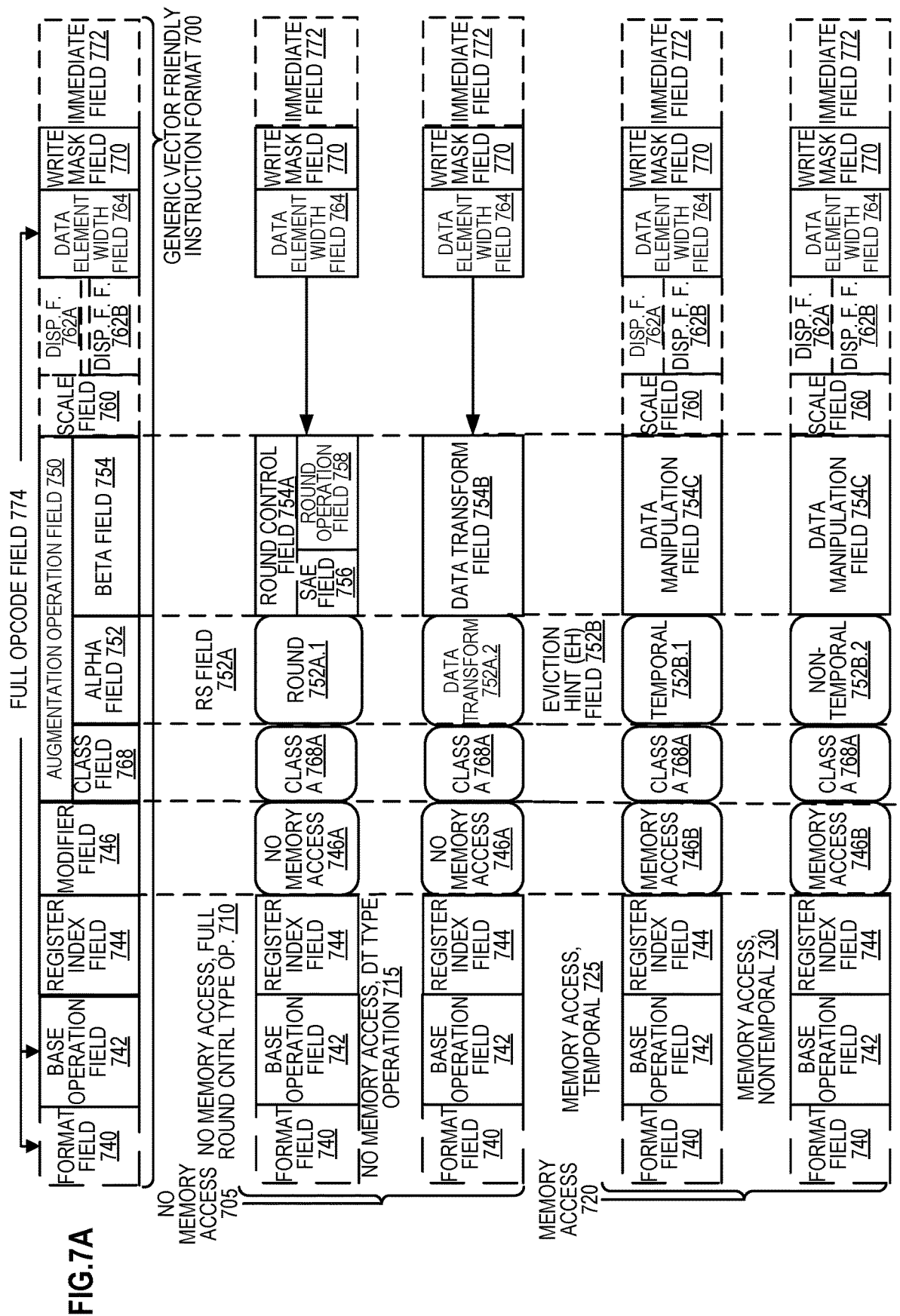
FIG. 7A is a block diagram illustrating a generic vector friendly instruction format and class A instruction templates thereof according to embodiments of the disclosure.
Figure 7B:
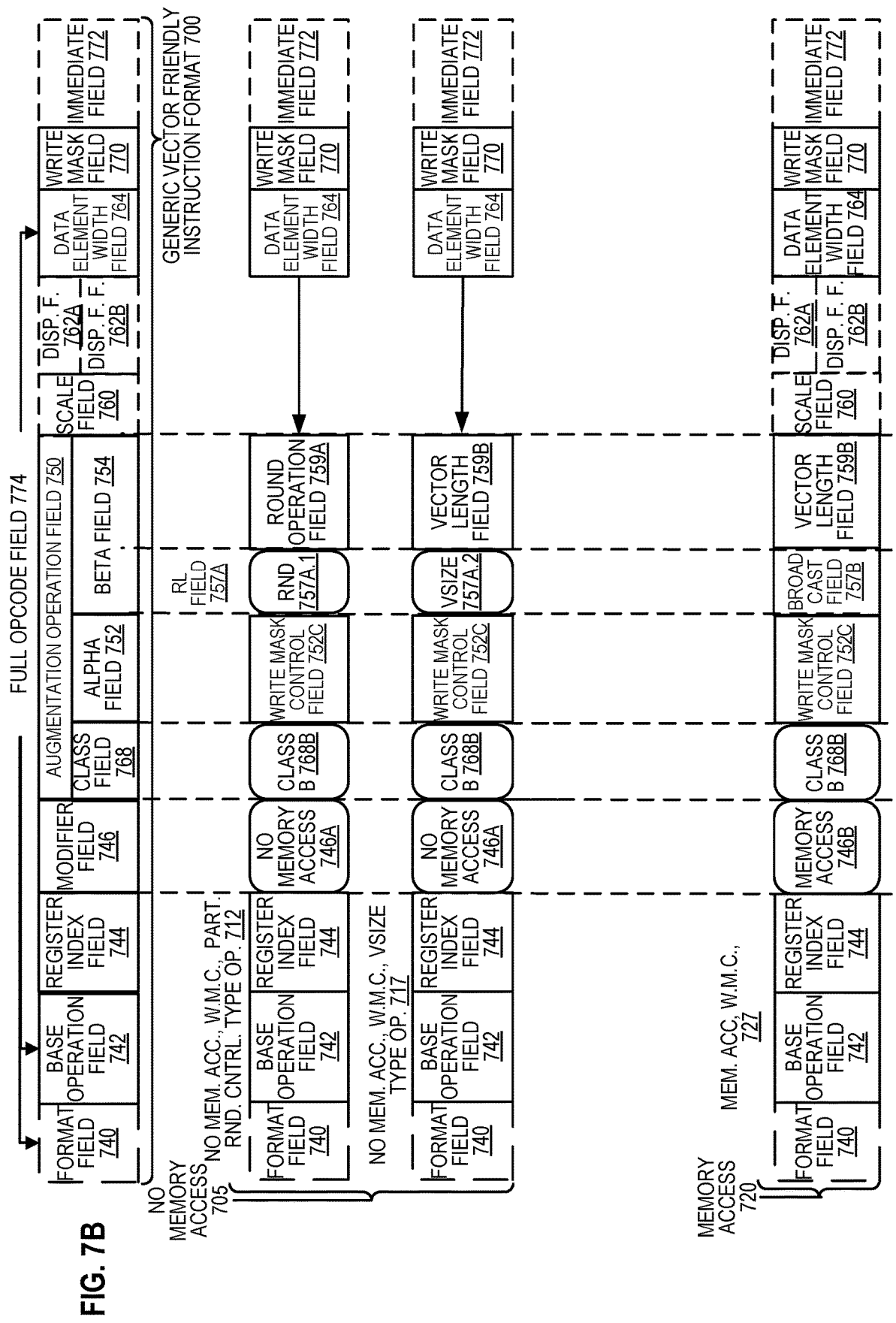
FIG. 7B is a block diagram illustrating the generic vector friendly instruction format and class B instruction templates thereof according to embodiments of the disclosure.

FIGS. 7A-7B are block diagrams illustrating a generic vector friendly instruction format and instruction templates thereof according to embodiments of the disclosure. FIG. 7A is a block diagram illustrating a generic vector friendly instruction format and class A instruction templates thereof according to embodiments of the disclosure; while FIG. 7B is a block diagram illustrating the generic vector friendly instruction format and class B instruction templates thereof according to embodiments of the disclosure. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the disclosure, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*$index+base).

Displacement Field 762A—its content is used as part of memory address generation (e.g., for address generation that uses $2^{scale}*$index+base+displacement).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the disclosure are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the disclosure the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the disclosure where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the disclosure where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-Purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to embodiments of the disclosure. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the disclosure are described with reference to the specific vector friendly instruction format 800 in the context of the generic vector friendly instruction format 700 for illustrative purposes, the disclosure is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the disclosure is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the disclosure).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]-R), EVEX.X bit field (EVEX byte 1, bit [6]-X), and 757BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (OF, OF 38, or OF 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]-U)–If EVEX.0=0, it indicates class A or EVEX.U0; if EVEX.0=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the disclosure. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the disclosure. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
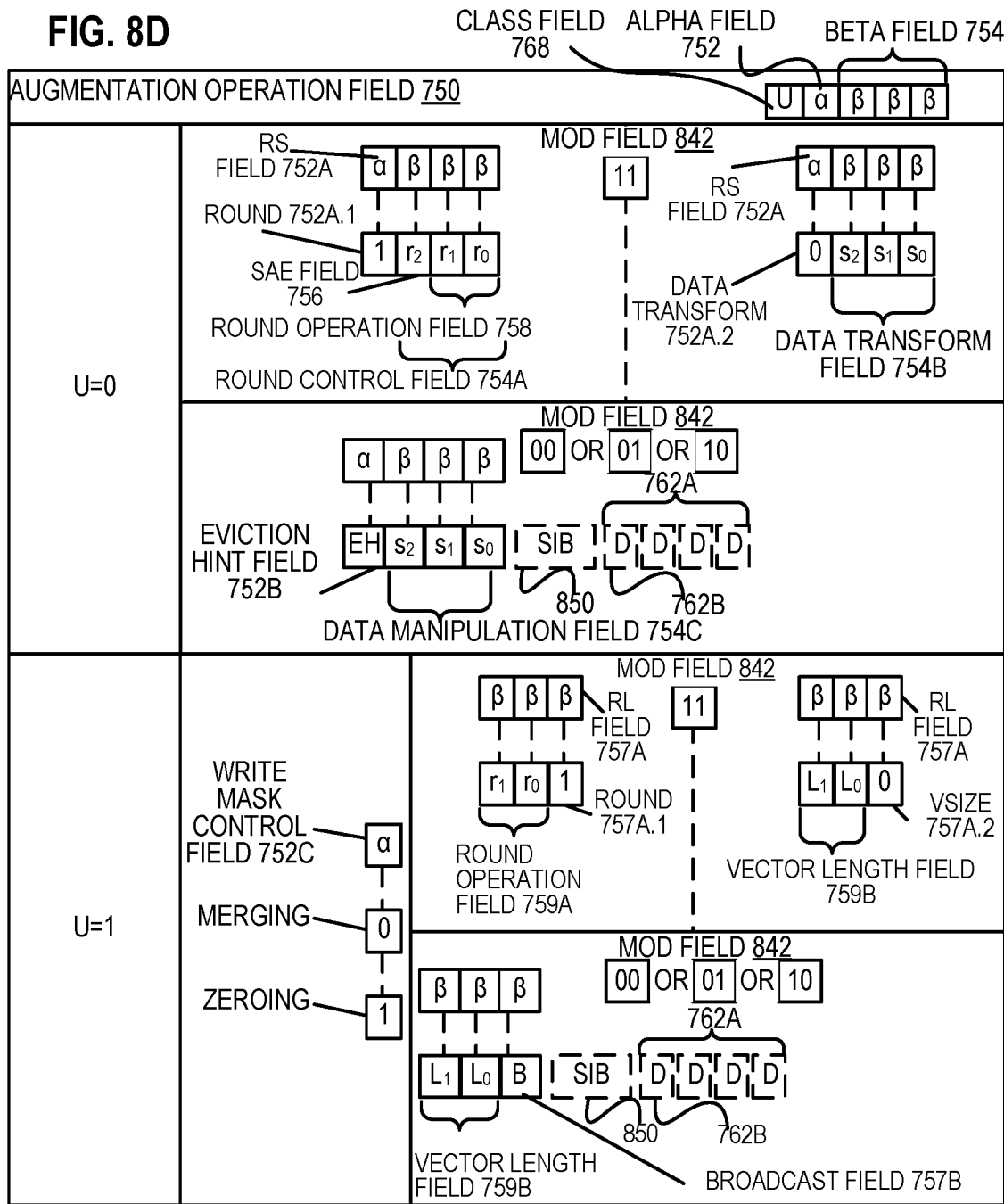
FIG. 8D is a block diagram illustrating the fields of the specific vector friendly instruction format in FIG. 8A that make up the augmentation operation field 750 according to one embodiment of the disclosure.

FIG. 8D is a block diagram illustrating the fields of the specific vector friendly instruction format 800 that make up the augmentation operation field 750 according to one embodiment of the disclosure. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-$S_0$) is interpreted as the RL field 757A; when it contains a 1 (round 757A.1) the rest of the beta field 754 (EVEX byte 3, bit [6-5]-$S_{2-1}$) is interpreted as the round operation field 759A, while when the RL field 757A contains a 0 (VSIZE 757.A2) the rest of the beta field 754 (EVEX byte 3, bit [6-5]-$S_{2-1}$) is interpreted as the vector length field 759B (EVEX byte 3, bit [6-5]-$L_{1-0}$). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-$L_{1-0}$) and the broadcast field 757B (EVEX byte 3, bit [4]-B).

Exemplary Register Architecture

Figure 9:
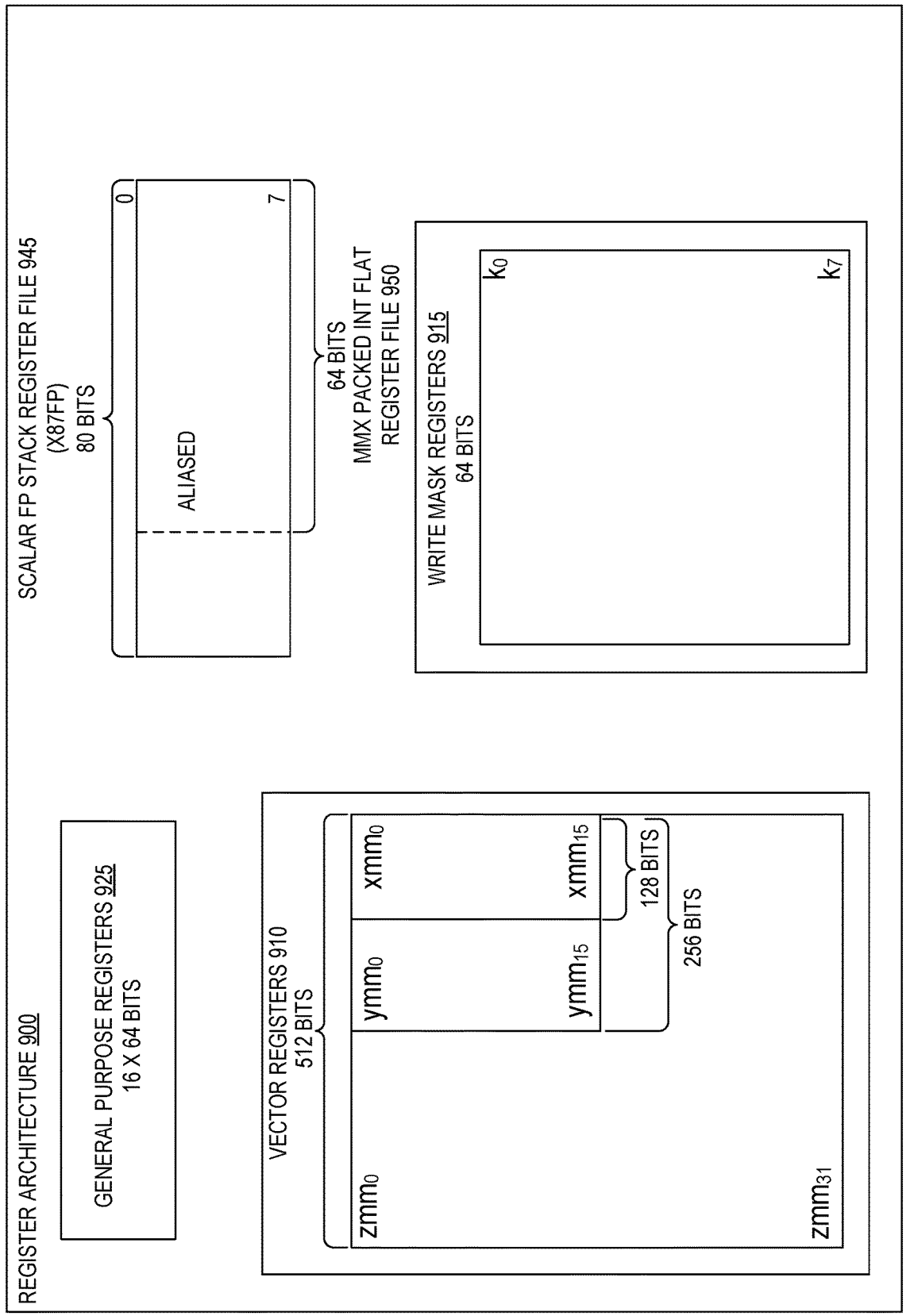
FIG. 9 is a block diagram of a register architecture according to one embodiment of the disclosure

FIG. 9 is a block diagram of a register architecture 900 according to one embodiment of the disclosure. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the disclosure. FIG. 10B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macro-instructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

In certain embodiments, a prefetch circuit 1078 is included to prefetch data, for example, to predict access addresses and bring the data for those addresses into a cache or caches (e.g., from memory 1080). In one embodiment, prefetch circuit 1078 is an instance of the prefetch circuit in FIG. 3B.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6)

the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
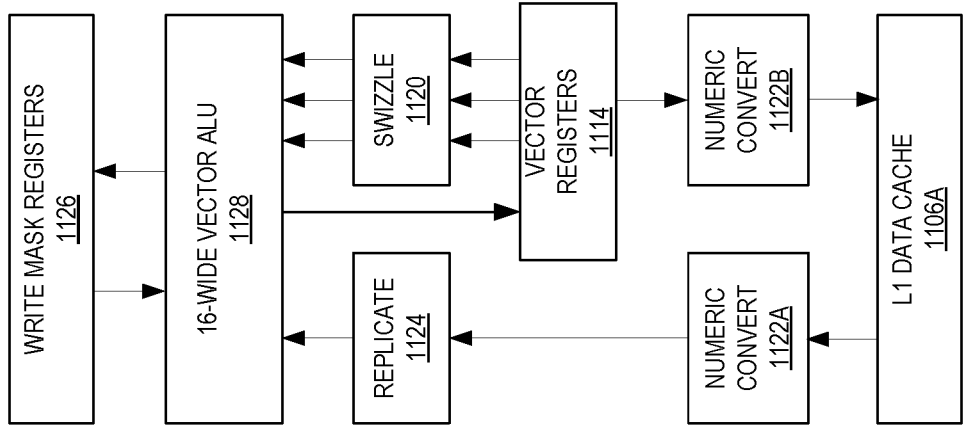
FIG. 11B is an expanded view of part of the processor core in FIG. 11A according to embodiments of the disclosure.
Figure 11A:
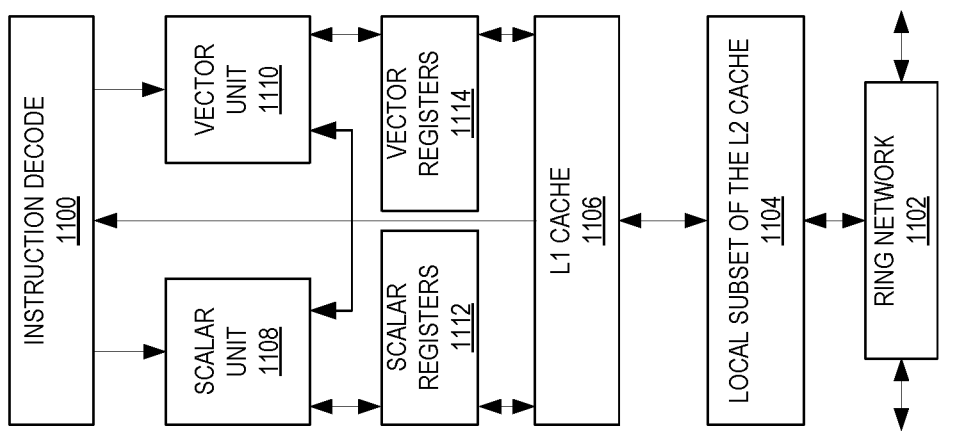
FIG. 11A is a block diagram of a single processor core, along with its connection to the on-die interconnect network and with its local subset of the Level 2 (L2) cache, according to embodiments of the disclosure.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the disclosure. In one embodiment, an instruction decode unit 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the disclosure may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the disclosure. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
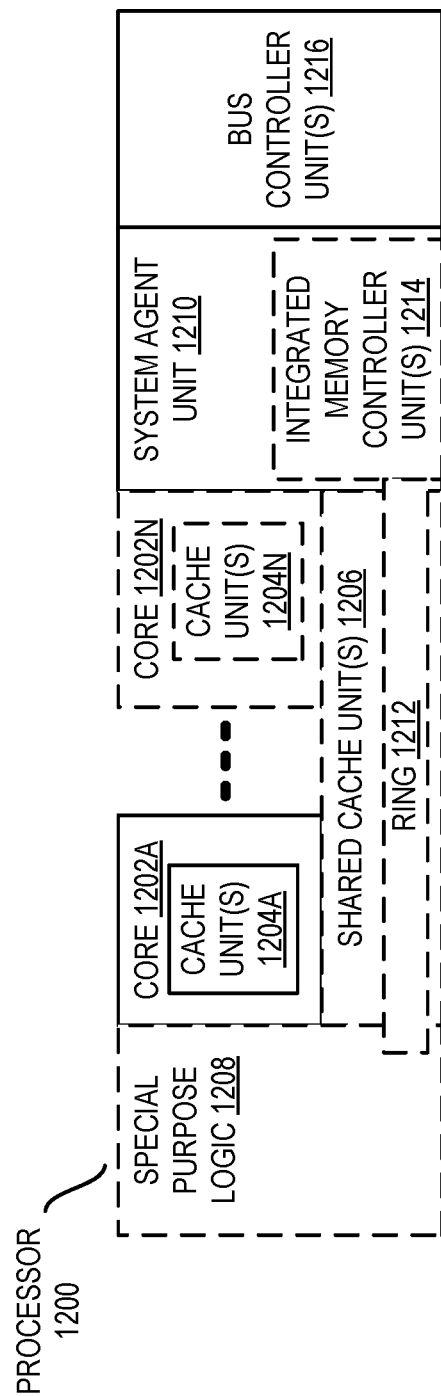
FIG. 12 is a block diagram of a processor that may have more than one core, may have an integrated memory controller, and may have integrated graphics according to embodiments of the disclosure.

FIG. 12 is a block diagram of a processor 1200 that may have more than one core, may have an integrated memory controller, and may have integrated graphics according to embodiments of the disclosure. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
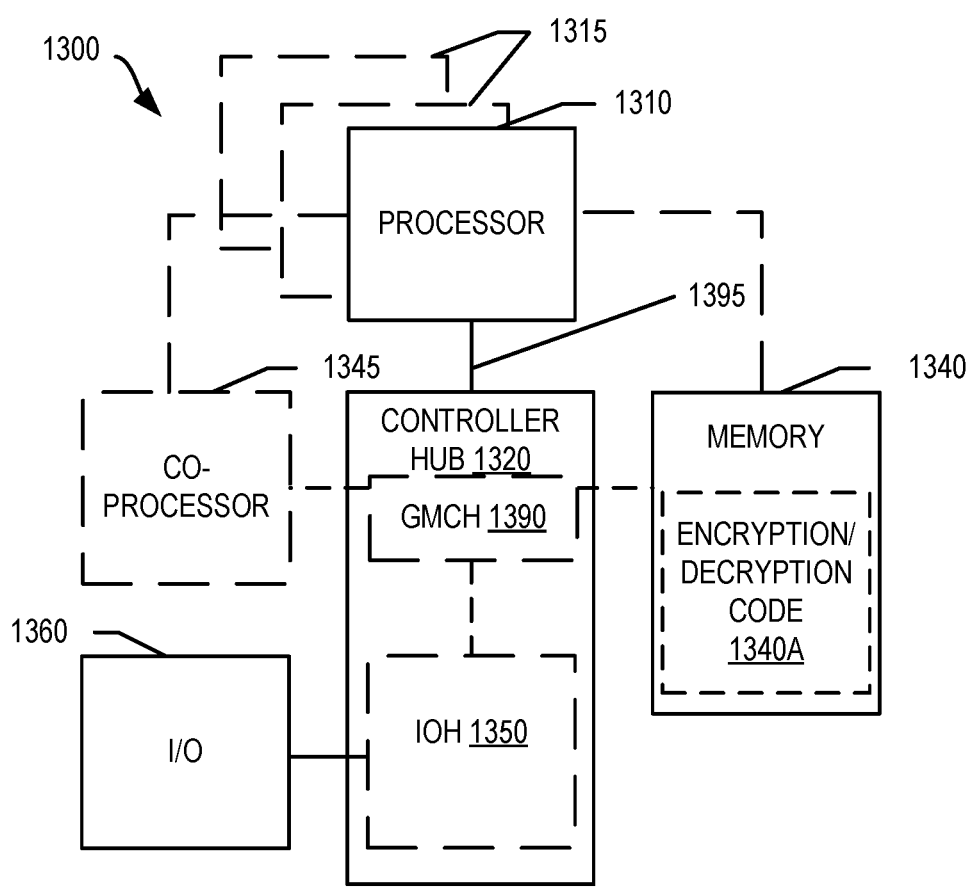
FIG. 13 is a block diagram of a system in accordance with one embodiment of the present disclosure.

Referring now to FIG. 13, shown is a block diagram of a system 1300 in accordance with one embodiment of the present disclosure. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350. Memory 1340 may include encryption/decryption code 1340A, for example, to store code that when executed causes a processor to perform any method of this disclosure.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as Quickpath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
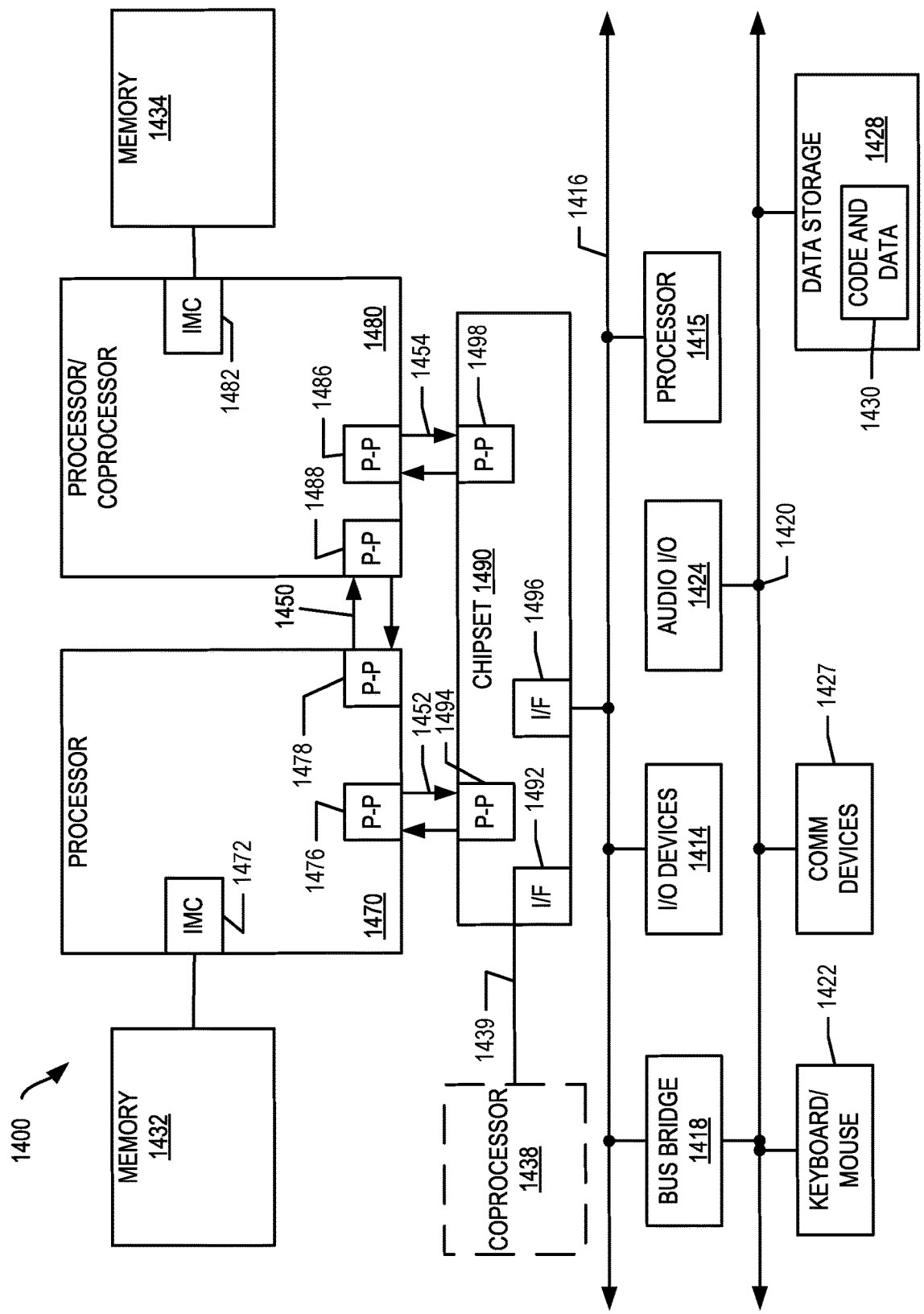
FIG. 14 is a block diagram of a more specific exemplary system in accordance with an embodiment of the present disclosure.

Referring now to FIG. 14, shown is a block diagram of a first more specific exemplary system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the disclosure, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
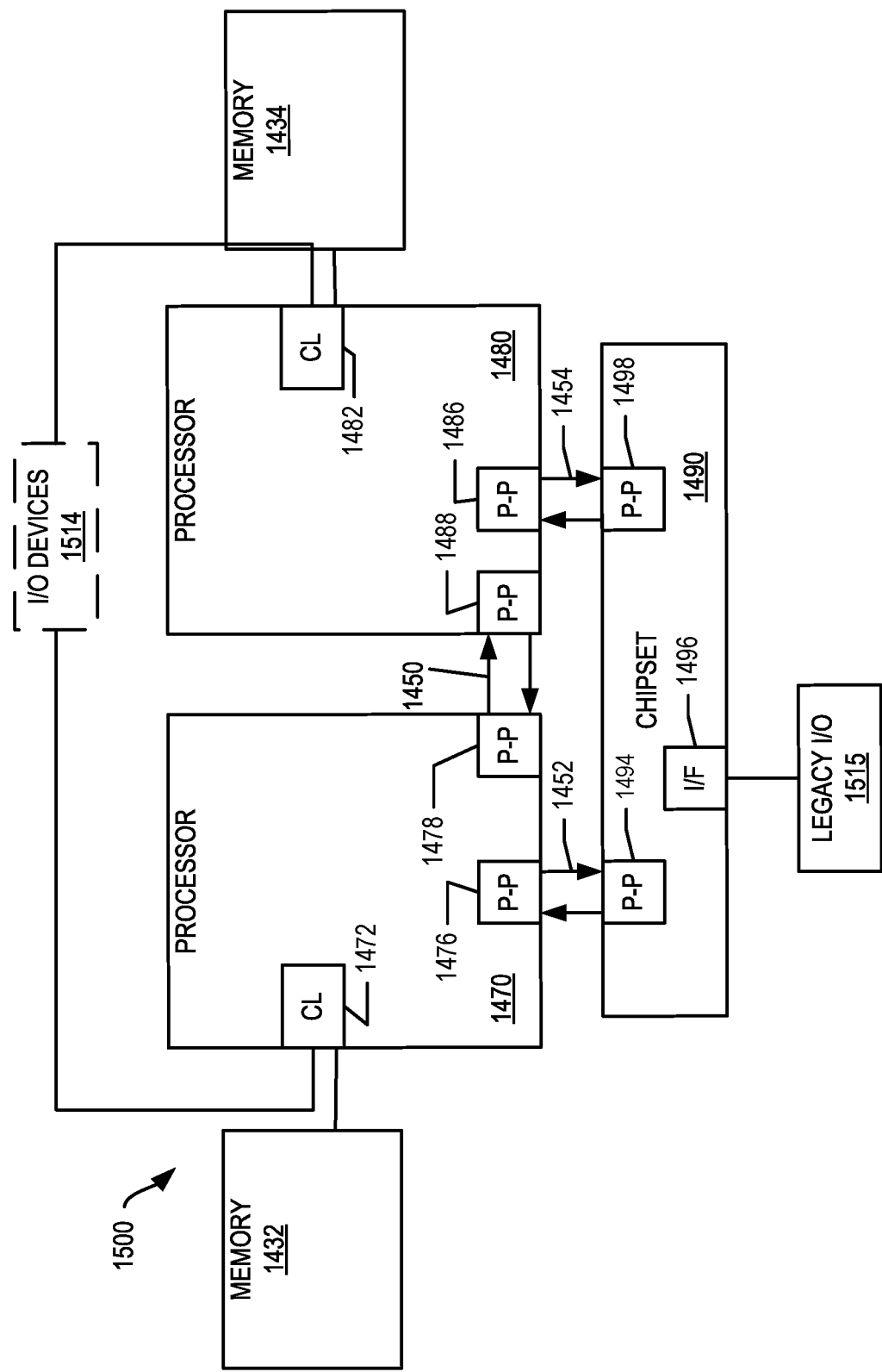
FIG. 15, shown is a block diagram of a second more specific exemplary system in accordance with an embodiment of the present disclosure.

Referring now to FIG. 15, shown is a block diagram of a second more specific exemplary system 1500 in accordance with an embodiment of the present disclosure Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
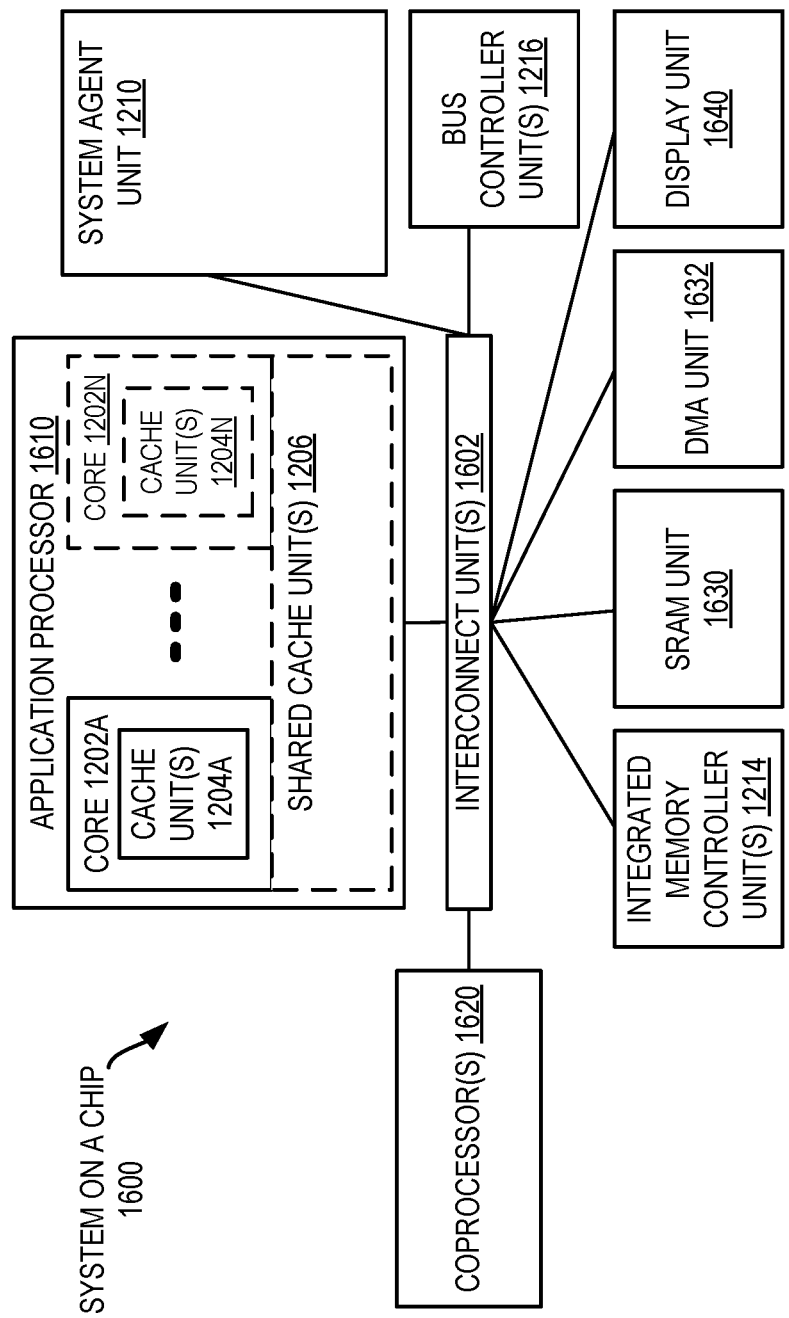
FIG. 16, shown is a block diagram of a system on a chip (SoC) in accordance with an embodiment of the present disclosure.

Referring now to FIG. 16, shown is a block diagram of a SoC 1600 in accordance with an embodiment of the present disclosure. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
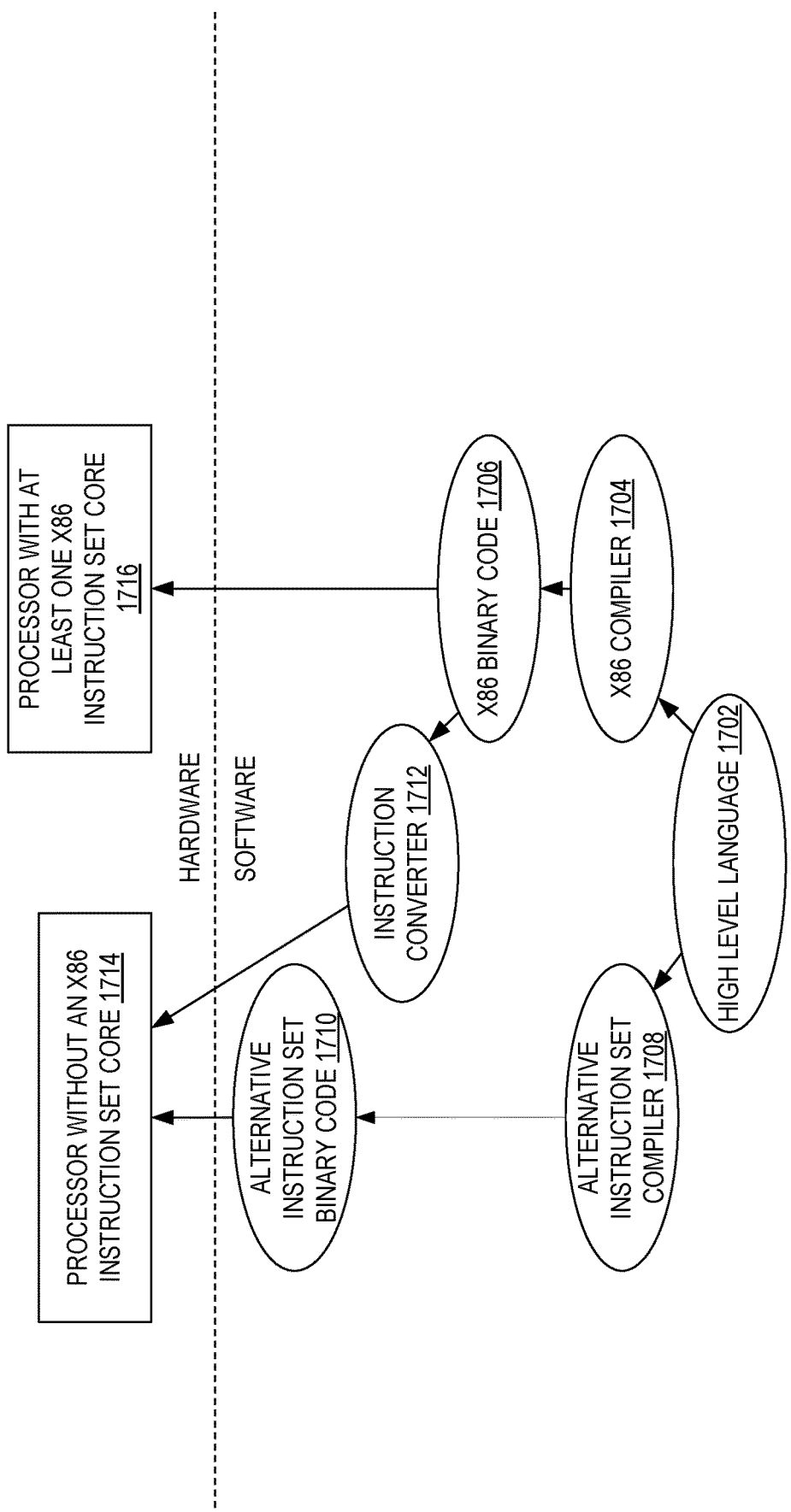
FIG. 17 is a block diagram contrasting the use of a software instruction converter to convert binary instructions in a source instruction set to binary instructions in a target instruction set according to embodiments of the disclosure.

FIG. 17 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

What is claimed is:

1. A hardware processor comprising:
   a decoder of a core to decode a single instruction into a decoded single instruction, the single instruction comprising a first input operand of a handle including a ciphertext of an encryption key, an authentication tag, and additional authentication data that indicates the handle is usable for decryption but not usable for encryption and indicates the handle is limited for use within a process whose process identification matches corresponding bits in the handle, and a second input operand of data encrypted with the encryption key; and
   an execution unit of the core to execute the decoded single instruction to:
      perform a first check of the authentication tag against the ciphertext and the additional authentication data for any modification to the ciphertext or the additional authentication data,
      perform a second check of a current request of the core against one or more restrictions specified by the additional authentication data of the handle,
      decrypt the ciphertext to generate the encryption key only when the first check indicates no modification to the ciphertext or the additional authentication data, and the second check indicates the one or more restrictions are not violated,
      decrypt the data encrypted with the encryption key to generate unencrypted data, and
      provide the unencrypted data as a resultant of the single instruction.

2. The hardware processor of claim 1, wherein the execution unit is to execute the decoded single instruction to set a flag when:
   the first check indicates a modification to the ciphertext or the additional authentication data; or
   the second check indicates the one or more restrictions are violated.

3. The hardware processor of claim 1, wherein the decoder is to decode a second instruction into a decoded second instruction, and the execution unit is to execute the decoded second instruction to load into a register of the core an internal key used to decrypt the ciphertext.

4. The hardware processor of claim 3, wherein the execution unit is to execute the decoded second instruction to set a first value in the register to indicate software requested a specific key as the internal key through execution of the second instruction, and set a second value in the register to indicate software requested a random key as the internal key through execution of the second instruction.

5. The hardware processor of claim 3, wherein the internal key comprises an integrity key and a separate encryption key.

6. The hardware processor of claim 1, wherein the decoder is to decode a second instruction into a decoded second instruction, and the execution unit is to execute the decoded second instruction to generate the handle from an input of the encryption key and a handle restriction type.

7. The hardware processor of claim 1, wherein the handle comprises a process restricted bit, that when set, indicates the handle is limited for use within the process.

8. A method comprising:
   decoding a single instruction into a decoded single instruction with a decoder of a core of a hardware processor, the single instruction comprising a first input operand of a handle including a ciphertext of an encryption key, an authentication tag, and additional authentication data that indicates the handle is usable for decryption but not usable for encryption and indicates the handle is limited for use within a process whose process identification matches corresponding bits in the handle, and a second input operand of data encrypted with the encryption key; and
   executing the decoded single instruction with an execution unit of the core to:
      perform a first check of the authentication tag against the ciphertext and the additional authentication data for any modification to the ciphertext or the additional authentication data,
      perform a second check of a current request of the core against one or more restrictions specified by the additional authentication data of the handle,
      decrypt the ciphertext to generate the encryption key only when the first check indicates no modification to the ciphertext or the additional authentication data, and the second check indicates the one or more restrictions are not violated,
      decrypt the data encrypted with the encryption key to generate unencrypted data, and
      provide the unencrypted data as a resultant of the single instruction.

9. The method of claim 8, wherein the executing the decoded single instruction sets a flag when:
   the first check indicates a modification to the ciphertext or the additional authentication data; or
   the second check indicates the one or more restrictions are violated.

10. The method of claim 8, further comprising:
    decoding a second instruction into a decoded second instruction with the decoder of the core; and executing the decoded second instruction with the execution unit of the core to load into a register of the core an internal key used to decrypt the ciphertext.

11. The method of claim 10, wherein the execution unit sets a first value in the register to indicate software requested a specific key as the internal key through execution of the second instruction, and sets a second value in the register to indicate software requested a random key as the internal key through execution of the second instruction.

12. The method of claim 8, further comprising:
decoding a second instruction into a decoded second instruction with the decoder of the core; and
executing the decoded second instruction with the execution unit of the core to generate the handle from an input of the encryption key and a handle restriction type.

13. The method of claim 8, wherein the handle comprises a process restricted bit, that when set, indicates the handle is limited for use within the process.

14. A non-transitory machine readable medium that stores program code that when executed by a machine causes the machine to perform a method comprising:
decoding a single instruction into a decoded single instruction with a decoder of a core of a hardware processor, the single instruction comprising a first input operand of a handle including a ciphertext of an encryption key, an authentication tag, and additional authentication data that indicates the handle is usable for decryption but not usable for encryption and indicates the handle is limited for use within a process whose process identification matches corresponding bits in the handle, and a second input operand of data encrypted with the encryption key; and
executing the decoded single instruction with an execution unit of the core to:
perform a first check of the authentication tag against the ciphertext and the additional authentication data for any modification to the ciphertext or the additional authentication data,
perform a second check of a current request of the core against one or more restrictions specified by the additional authentication data of the handle,
decrypt the ciphertext to generate the encryption key only when the first check indicates no modification to the ciphertext or the additional authentication data, and the second check indicates the one or more restrictions are not violated,
decrypt the data encrypted with the encryption key to generate unencrypted data, and
provide the unencrypted data as a resultant of the single instruction.

15. The non-transitory machine readable medium of claim 14, wherein the executing the decoded single instruction sets a flag when:
the first check indicates a modification to the ciphertext or the additional authentication data; or
the second check indicates the one or more restrictions are violated.

16. The non-transitory machine readable medium of claim 14, further comprising:
decoding a second instruction into a decoded second instruction with the decoder of the core; and
executing the decoded second instruction with the execution unit of the core to load into a register of the core an internal key used to decrypt the ciphertext.

17. The non-transitory machine readable medium of claim 16, wherein the execution unit sets a first value in the register to indicate software requested a specific key as the internal key through execution of the second instruction, and sets a second value in the register to indicate software requested a random key as the internal key through execution of the second instruction.

18. The non-transitory machine readable medium of claim 14, further comprising:
decoding a second instruction into a decoded second instruction with the decoder of the core; and
executing the decoded second instruction with the execution unit of the core to generate the handle from an input of the encryption key and a handle restriction type.

19. The non-transitory machine readable medium of claim 14, wherein the handle comprises a process restricted bit, that when set, indicates the handle is limited for use within the process.

20. A hardware processor comprising:
a decoder of a core to decode a single instruction into a decoded single instruction, the single instruction comprising an input operand of a handle including a ciphertext of original data, an authentication tag, and additional authentication data that indicates the handle is usable for decryption but not usable for encryption and indicates the handle is limited for use within a process whose process identification matches corresponding bits in the handle; and
an execution unit of the core to execute the decoded single instruction to:
perform a first check of the authentication tag against the ciphertext and the additional authentication data for any modification to the ciphertext or the additional authentication data,
perform a second check of a current request of the core against one or more restrictions specified by the additional authentication data of the handle,
decrypt the ciphertext to generate the original data only when the first check indicates no modification to the ciphertext or the additional authentication data, and the second check indicates the one or more restrictions are not violated,
perform an operation on the original data to generate result data, and
provide the result data as a resultant of the single instruction.

21. The hardware processor of claim 20, wherein the additional authentication data comprises a field that indicates when the handle is not usable outside an operating system.

22. The hardware processor of claim 20, wherein the additional authentication data comprises a field that indicates when the handle is not usable outside a specific trusted execution environment.

23. The hardware processor of claim 20, wherein the additional authentication data comprises a field that indicates when the handle is only usable when a specific piece of operating system controlled state is set in a specific way.

24. The hardware processor of claim 20, wherein the additional authentication data comprises a field that indicates when the handle is usable by a virtual machine monitor but not usable by a virtual machine.

25. The hardware processor of claim 20, wherein the additional authentication data comprises a field that indicates when the handle is usable for encryption but not usable for decryption.

* * * * *